United States Patent [19]
Meschke et al.

[11] Patent Number: 4,857,218
[45] Date of Patent: Aug. 15, 1989

[54] LUBRICATION METHOD AND COMPOSITIONS FOR USE THEREIN

[75] Inventors: Debra J. Meschke, Valley Cottage, N.Y.; Kenneth L. Hoy, St. Albans, W. Va.

[73] Assignee: Union Carbide Corporation, Danbury, Conn.

[21] Appl. No.: 768,473

[22] Filed: Aug. 22, 1985

Related U.S. Application Data

[63] Continuation-in-part of Ser. No. 641,640, Aug. 17, 1984, abandoned, which is a continuation-in-part of Ser. No. 468,670, Feb. 22, 1983, abandoned.

[51] Int. Cl.$^4$ ............... C10M 145/00; C10M 173/02
[52] U.S. Cl. .................. 252/49.3; 252/49.5; 252/52 A; 252/49.6; 252/49.8; 252/32.5; 252/50; 568/620; 568/623; 568/624; 568/625
[58] Field of Search ............. 252/49.3, 49.5, 52 A; 568/620, 623, 624, 625

[56] References Cited

U.S. PATENT DOCUMENTS

| | | | |
|---|---|---|---|
| 2,552,529 | 5/1951 | DeGroote | 252/331 |
| 2,552,532 | 5/1951 | DeGroote | 252/331 |
| 2,723,285 | 11/1955 | DeGroote | 252/331 |
| 4,212,750 | 7/1980 | Gorman | 252/32.5 |

Primary Examiner—Jacqueline V. Howard
Attorney, Agent, or Firm—Gerald L. Coon

[57] ABSTRACT

Lubricant compositions having good dilution viscosity characteristics and high viscosity/pressure coefficients can be produced using a connected branch copolymer having a core segment, non-crosslinked branched polymer segments connected to the core segment and a group of linear polymer segments connected to the branched polymer segments and bearing terminal groups capable of effecting hydrogen bonding. These connected branch copolymers are used in aqueous lubricant compositions, which may include a co-solvent such as ethylene or diethylene glycol.

73 Claims, 11 Drawing Sheets

LUBRICATION METHOD AND COMPOSITIONS FOR USE THEREIN

This application is a continuation-in-part of our copending application Ser. No. 641,640, filed Aug. 17, 1984, which in turn is a continuation-in-part of our application Ser. No. 468,670, filed Feb. 22, 1983 and both now abandoned.

FIELD OF THE INVENTION

This invention relates to lubrication methods and compositions for use therein. More specifically, this invention relates to such methods and compositions in which the lubricant composition comprises an aqueous solution of a connected branch copolymer.

BACKGROUND OF THE INVENTION

The physical theory of lubrication is now well understood; see, for example:

Bondi, A., Physical Chemistry of Lubricating Oils, Reinhold Publishing Corp., New York, N.Y. (1951);

Cameron, A., The Principles of Lubrication, Wiley & Sons, Inc., New York, N.Y. (1967);

Ferry, John D., Viscoelastic Properties of Polymers, Wiley & Sons, Inc., New York, N.Y. (1961).

As described in these and other standard works on the subject, three distinct types of lubrication occur, namely hydrodynamic, thin-film and boundary lubrication. Hydrodynamic lubrication occurs when there is a continuous thick film of fluid totally separating the surfaces moving relative to one another, this film being much thicker than any surface irregularities or roughness on the moving surfaces. The coefficient of friction is very low, typically of the order of 0.001, and no wear occurs. This is, of course, the ideal lubrication condition and if it could be maintained the moving parts would last indefinitely.

As the load applied to the relatively moving parts is increased, the thickness of the lubricant film decreases, so that thin-film or elastohydrodynamic lubrication appears. In this type of lubrication, the film is typically of the order of two microns thick and the hydrodynamic pressure exerted by the film is increased and is sufficient to deform the adjacent substrates. This increased localized pressure has the profound and useful effect of increasing the viscosity of the lubricant. As shown in standard works on the subject, for example:

Partington, J. R., An Advanced Treatise on Physical Chemistry, Volume II, Longmans (1962), the increase in lubricant viscosity with pressure is governed by the Warburg-Sachs equation:

$$n_2 = n_1[1 - a(P_2 - P_1)]$$

where $n_1$ and $n_2$ are the viscosities at pressures $P_1$ and $P_2$ respectively and a is a constant for a given fluid and is known as the viscosity/pressure coefficient.

In thin-film lubrication, almost all the physical properties of the fluid play a role i.e. viscosity/pressure coefficient, viscosity/temperature coefficient, thermal conductivity etc. are all important in determining the behavior of a lubricant in thin-film lubrication.

The third type of lubrication, boundary lubrication, occurs under severe conditions of high load per unit area and low relative speed between the relatively moving surfaces. Under these severe conditions, it is impossible to maintain adequate lubrication and the lubricant is essentially absorbed onto the surfaces to form protective films. Because the lubricant action is that of the absorbed films, the bulk properties of the lubricant fluid, such as viscosity, are relatively unimportant. Instead, the chemical interaction between the lubricant and the surface is the critical parameter. Accordingly, when it is essential to rely upon this type of lubrication, extreme pressure additives are added to the fluid. Such additives generally contain a moiety, for example chlorine or phosphorus, which reacts with the metals to provide a protective, inorganic lubricating surface layer.

In many commercially important applications, the loadings on the moving parts are such that it is not practical to maintain hydrodynamic lubrication, but it is practical to maintain thin-film lubrication; for obvious reasons, boundary lubrication is avoided unless it is absolutely necessary. Accordingly, the viscosity/pressure coefficient is an important parameter of lubricant compositions used in such applications and a high value of this coefficient is desirable in order that the viscosity will increase rapidly with pressure and provide good protection to the lubricated surfaces.

Mineral oils are, of course, known to be good lubricants and typically have viscosity/pressure coefficients of about $4.8 \times 10^{-4}$ atm.$^{-1}$ at 30° C., as noted in Partington, supra. Water is an extremely bad lubricant and actually has a negative viscosity pressure coefficient of $-1.7 \times 10^{-4}$ atm.$^{-1}$ at 25° C., as noted in Partington, supra.

Pure ethylene glycol is a good lubricant having a viscosity/pressure coefficient of $4.3 \times 10^{-4}$ atm.$^{-1}$ at 25° C. Diethylene glycol has an even better viscosity/pressure coefficient of $4.6 \times 10^{-4}$ atm.$^{-1}$ at the same temperature. Unfortunately, the addition of even modest amounts of water to ethylene or diethylene glycol drastically reduces the viscosity/pressure coefficient of the glycol; mixtures of 44 weight percent ethylene or diethylene glycol with 56 weight percent water have a viscosity/pressure coefficient of zero. Since it is in practice impossible to keep ethylene or diethylene glycol anhydrous under industrial conditions (the pure materials are hygroscopic), the dramatic drop in viscosity/pressure coefficient on addition of water essentially destroys the potential usefulness of pure ethylene and diethylene glycols as lubricants.

It is known that the rapid drop in viscosity/pressure coefficient occurring when ethylene or diethylene glycol is diluted with water can be retarded by adding to the glycol/water mixture a substantial proportion of a polyalkylene glycol. One such glycol used commercially in water-based lubricating compositions is sold by Union Carbide Corporation under the Registered Trademark UCON Fluid 75-H-90M. This material is essentially a linear copolymer of 75 percent ethylene oxide and 25 percent propylene oxide having an average molecular weight of approximately 10300 and a neat viscosity of approximately 90000 Saybolt universal seconds (sus.) at 37.8° C. The only side chains on the essentially linear copolymer are due to the methyl groups of the propylene oxide residues. A lubricant composition containing 20 weight percent of this linear polymer, 35 weight percent ethylene glycol and 45 weight percent water has a viscosity pressure coefficient of $3.09 \times 10^{-4}$ atm.$^{-1}$ at 25° C., while the corresponding composition using diethylene glycol has a viscosity pressure coefficient of $3.39 \times 10^{-4}$ atm.$^{-1}$ at the same temperature.

For economic and safety reasons, there is a great demand to increase the proportion of water in water-based lubricant compositions; the 20 percent of the linear polymer used in the compositions just discussed comprises by far the greater proportion of the cost of lubricant composition. Unfortunately, the viscosity of the linear polymer/ethylene (or diethylene) glycol/water lubricant compositions falls very rapidly as the proportion of water is increased, so that as a practical matter the proportion of water cannot be increased above about 50 percent. In contrast, increasing the proportion of water decreases the flammability of the lubricant composition.

In experiments leading to the present invention, numerous modifications of the linear polymer/glycol/water lubricants discussed above were made in an attempt to produce a lubricant containing a higher proportion of water. It was found that the viscosity/pressure coefficient was only slightly affected by the type of glycol, amount of glycol and molecular weight of the polymer. Various changes in the linear polymer, for example in the starter alcohol used, (ethylene oxide:propylene oxide) ratio and the oxide sequencing, also only had marginal effects on the viscosity/pressure coefficient. Accordingly, it appeared that the viscosity/pressure coefficient was primarily dependent upon the water concentration and that achieving high water content with this type of lubricant composition was highly unlikely.

It would also be desirable, if possible, to reduce or eliminate the relatively expensive glycol used in such lubricant compositions, if this could be done without greatly increasing the polymer content of the composition, and polymers intended for use in such glycol-free aqueous lubricant compositions have recently been marketed commercially.

There is thus a need for a water-based lubricant composition which will perform satisfactorily at higher water contents than prior art water-based lubricant compositions, and this invention provides such a lubricant composition and a method for its use.

SUMMARY OF THE INVENTION

It has been discovered that, if certain of the connected branch copolymers described in our aforementioned copending application Ser. No. 641,640 are employed in water or water/glycol lubricant compositions in place of the linear polyalkylene glycol polymers hitherto used, the water content of the lubricant compositions can be increased while still retaining satisfactory lubricating properties.

Accordingly, this invention provides a method of reducing friction between two articles moving relative to, and closely adjacent one another by disposing between adjacent surfaces of the two articles a lubricant composition comprising water and a polymer dissolved therein, in which process the polymer is a connected branch copolymer comprising a core segment having a valence of v, where v is an integer, and having correspondingly v terminal bonds connected to v polyvalent, non-crosslinked branched polymer segments each having an average of t terminal bonds, wherein t is greater than about 2, one of these terminal bonds being connected to the core segment, and each of the branched polymer segments being connected via its remaining (t−1) terminal bonds to a set of linear polymer segments with an average of (t−1) linear polymer segments per set, to provide a group of about v(t−1) linear polymer segments wherein the linear polymer segments have substantially similar chain lengths and composition within the group, the connected branch copolymer having a group of terminal linear polymer segments bearing terminal group capable of effecting hydrogen bonding.

This invention also provides a lubricant composition comprising at least about 40 percent by weight of water, from about 5 to about 55 percent by weight of an alkylene glycol and from about 2 to about 40 percent by weight of a connected branch copolymer as defined above.

Finally, this invention provides a lubricant composition comprising from 80 to 98 percent by weight of water and, dissolved in the water, from 20 to 2 percent by weight of a connected branch copolymer as defined above.

The term "terminal linear polymer segments" is used herein to denote the group of linear polymer segments most remote from the core segment of the connected branch copolymer, these terminal linear polymer segments each having one terminal connected to a branched polymer segment, while the other terminal of each linear polymer segment is free and not attached to a branched polymer segment. As described in detail below, the connected branch copolymers may have a plurality of groups of branched polymer segments and plurality of groups of linear polymer segments alternating with the groups of branched polymer segments as one moves outwardly from the core segment of the connected branch copolymer. In such connected branch copolymers having multiple groups of branched and linear polymer segments, the inner, non-terminal group(s) of linear polymer segments will of course have both their terminals connected to differing groups of branched polymer segments and will thus not have any free terminals. In such complex connected branch copolymers, it is only the outermost, terminal group of linear polymer segments which must bear terminal group capable of effecting hydrogen bonding.

DETAILED DESCRIPTION OF THE INVENTION

Figure 1:
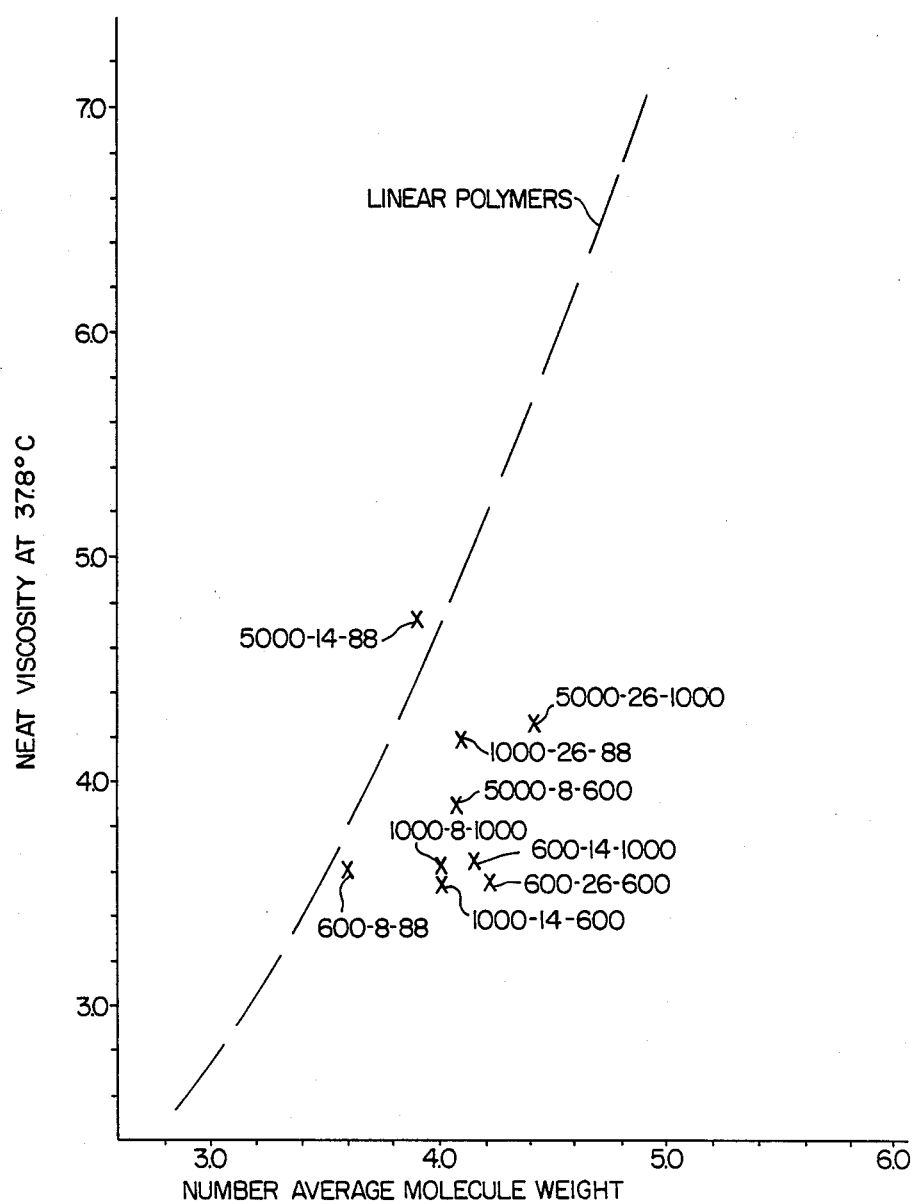
FIG. 1 is a graph of viscosity against number average molecular weight for connected branch copolymers useful in the methods and lubricant compositions of the invention, as described in Example 4 below.

The connected branch copolymers bearing terminal groups capable of effecting hydrogen bonding used in the processes and compositions of the present invention are part of a wider group of connected branch copolymers described in our aforementioned copending application Ser. No. 641,640, the entire disclosure of which is herein incorporated by reference.

Accordingly, in order that the nature of the connected branch copolymers used in the processes and compositions of the present invention, and the processes used for their preparation, may be concisely described, the nature and preparation of the wider group of connected branch copolymers described in our aforementioned application Ser. No. 641,640, will first be described. Thereafter, the special requirements imposed on the connected branch copolymers by their use in the processes and compositions of the present invention, and the preferred types of connected branch copolymers for use in such processes and compositions will be described.

The connected branch copolymers disclosed in the aforementioned copending application Ser. No. 641,640, are derived from three main classes of reactants. These reactants, when reacted together in the appropriate manner, form the three primary segments—core, branch, and linear—which make up the connected branch copolymer.

The core segment comprises a reactant which has at least one reactive functional group. The term core reactant encompasses any compound which by the presence of reactive groups acts as a nucleating agent on to which branching polymerization monomers can be bonded. The core reactant can therefore be monomeric or polymeric, organic or inorganic, monofunctional or polyfunctional, so long as at least one reactive functional group is provided in its structure. The term "reactive functional group" is defined as any moiety which can react with a complementary moiety in the branching polymerization monomer to form a chemical bond. Such reactions encompass well-established chemical procedures for free radical, substitution or condensation reactions. Representative examples of a few of such reactions include the following:

| Functional Moiety | Complementary Moiety | Group Formed (Containing Covalent Bond) |
|---|---|---|
| —OH | $H_2C\overset{O}{-\!-\!-\!-\!-}CH-$ | $-O-CH_2-\overset{OH}{\underset{|}{C}H}-$ |

| Functional Moiety | Complementary Moiety | Group Formed (Containing Covalent Bond) |
|---|---|---|
| | $H_2C\overset{NH}{-\!-\!-\!-\!-}CH-$ | $-O-CH_2-\overset{NH_2}{\underset{|}{C}H_2}$ |
| | HOOC— | $-O-\overset{O}{\underset{\|}{C}}-$ |
| | O=C=N— | $-O-\overset{O}{\underset{\|}{C}}-\overset{H}{\underset{\|}{N}}-$ |
| —NH$_2$ | O=C=N— | $-\overset{H}{\underset{\|}{N}}-\overset{O}{\underset{\|}{C}}-\overset{H}{\underset{\|}{N}}-$ |
| | HOOC— | $-\overset{H}{\underset{\|}{N}}-\overset{O}{\underset{\|}{C}}-$ |

Derivatives of such moieties are also intended to be included. The reactive functional group on the core reactant may be selected from either group of functional or complementary moieties so long as the moiety on the branching polymerization monomer is complementary to that moiety.

Monomeric core reactants include hydroxy-compounds such as phenols and alkanols; amino-compounds such as mono-, di- or polyamines; carboxylic acids and their derivatives; siloxanes; and other compounds which contain at least one reactive functional group.

The core reactant may be of polymeric, linear, branched or star configuration. Linear core reactants which have reactive functional groups include polymers such as polyethers, polyesters, polysiloxanes, polyurethanes, polyamines, polyamides, polyolefins, to name but a few. Preferred linear core reactants include polyalkylene oxide glycols, higher aliphatic polyols and related hydroxy-terminated compounds. In a particularly preferred embodiment, the linear core reactant contains two reactive functional groups i.e. the valence v is preferably 2.

Core reactants providing a star configuration are defined a compounds which contain molecular chains having multiple functional groups covalently bonded through a chain of atoms to a single, central atom or backbone. Examples of such star reactants which contain functional hydroxyl groups are glycerol (v=3), pentaerythritol (v=4), dipentaerythritol (v=6) and trimethylolpropane (v=3). Such star core reactants may be extended by polymerizing monomers onto each molecular chain, prior to connected branch copolymer formation.

One molecule of a monomeric or polymeric core reactant is provided as a single starter for each connected branch copolymer molecule.

The second portion of the connected branch copolymer is a branched segment produced by reacting non-crosslinking, branching polymerization monomers with the core reactant. The non-crosslinking, branching polymerization monomers are defined as monomers having functional groups which provide an additional functional group after the monomer has been polymerized at two reactive sites of the monomer. In other words, each branching polymerization monomer provides at least one additional reactive site for polymer chain growth. When the branching polymerization monomer is reacted with a core reactant, one of the reactive functional groups of the monomer reacts with the complementary reactive functional group in the core reactant to produce a branched core compound having a mono-, di- or polyvalent core segment terminated with non-crosslinking, branching polymer segments having at least two branch ends, i.e., sites, defined by the other two reactive sites. One of the remaining reactive sites of the branching polymerization monomer provides a reactive site for extending the branched segment by reaction with another branching polymerization monomer. The remaining reactive site provides a functional group which can be used to initiate a branch, as described below. As a result, branching polymerization monomers containing three reactive sites produce $b+1$ branches per b moles of branching polymerization monomer for each reactive functional group on the core reactant.

The connected branch copolymers are preferably essentially free of any crosslinking in order to achieve the maximum reduction in neat viscosity without the formation of gel particles when used in aqueous systems. Crosslinking, on the other hand, of the connected branch structure would tend to increase the viscosity leading ultimately to gel formation.

Preferred non-crosslinking, branching polymerization monomers are compounds which undergo substantially linear homopolymerization. Such compounds contain a functional group at a third reactive site which does not readily react during the branching polymerization. Examples of such kinds of compounds include imines, hydroxy-containing oxiranes, and other polyfunctional compounds which are not crosslinkable.

Particularly preferred non-crosslinking branching polymerization monomers include compounds having three-membered oxygen- or nitrogen-containing ring structures, i.e., oxiranes and imines, respectively. In the case of oxirane compounds, there is an additional functional group present to provide the third reactive site for the branching polymerization monomer. A preferred class of branching polymerization monomers are compounds having the structure:

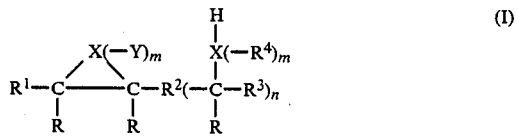

(I)

wherein X is nitrogen, oxygen, or sulfur; Y is alkyl, alkylamine, or hydroxyalkyl; R can be hydrogen or lower alkyl; $R^1$ and $R^3$ are each hydrogen, alkyl, aryl or aralkyl; $R^2$ is (1) an alkyl, aryl or aralkyl group which may be connected to $R^1$ to form a cyclic ring, or (2) hydrogen when n is 0; $R^4$ is hydrogen or lower alkyl; m is (1) 0 when X is oxygen or sulfur, or (2) 1 when X is nitrogen; n is 0 or 1, provided that n is 1 when X is oxygen or sulfur. When X is oxygen or sulfur, two reactive sites during polymerization are provided by the X and Y moieties, with a third reactive site provided by a carbon atom in the three-membered ring. When X is nitrogen, providing an imine, two of the three reactive sites are provided by the nitrogen atom with the other reactive site provided by a carbon atom in the three membered ring.

Particularly preferred branching polymerization monomers with the structure of Formula I are glycidol and ethyleneimine, i.e. aziridine.

The branching polymerization monomer may be added to the core reactant in a molar ratio of about 2 to about 50 moles, and preferably about 2 to about 20 moles, of branching polymerization monomer to each equivalent of core reactant. Since b moles of branching polymerization monomer provide $b+1$ branches for each reactive core terminal group, the average number of branches per branching segment can be defined by the formula:

$$\frac{b+1}{c} \qquad (II)$$

wherein b is the number of moles of branching monomer added, and c is the number of reactive functional groups on the core reactant. Using this relationship, it is apparent that the branching structure of the connected branch copolymer can be controlled by varying the amount of branching polymerization monomers utilized as well as by selecting core reactants with differing numbers of reactive terminal groups. Thus, for example, if a linear core segment ($c=2$) is employed, the average number of terminal bonds t of the branched polymer segments in the resulting connected branch copolymer will be from 1.5 to 25.5, and preferably from 1.5 to 10.5.

In another embodiment, a linear polymerization monomer may be copolymerized with the branching polymerization monomer during the branching polymerization step to provide a randomly branched copolymer structure as the branched segment. The addition of linear polymerization monomers does not change the number of branches in that the relationship of $b+1$ branches per b moles of branching polymerization monomer is maintained. Instead, the average distance between branches is extended depending upon the amount of linear polymerization monomer provided. This results in a reduced branching density within the branched segment. Any of the linear polymerization monomers set forth below, which can undergo polymerization with the branching polymerization monomer, can be utilized to provide copolymerization.

The core reactant and branching polymerization monomer may be selected so that the core segment comprises units identical to monomeric units present in the branched polymer segment. Such a complex branched core segment can be produced by providing a core segment identical to linear polymerization monomers copolymerized with branching polymerization monomers during the branching polymerization step. For example, a core reactant such as ethylene glycol will provide an ethylene diether core segment indistinguishable from oxyethylene monomeric units derived by reacting ethylene oxide as a linear polymerization monomer which may be added during the branching polymerization step. The valence v of such a complex core segment is limited only by the difficulty of synthesising complex core segments with large valences.

The third part of the connected branch copolymer structure is generated by reacting linear polymerization monomers on to the reactive sites in the branches of the branched core compound after the branching polymerization has been completed. The linear polymerization monomer is polymerized on to substantially each branch reactive site to produce sets of linear polymer segments for each branched polymer segment. In this manner, the linear polymer segments polymerized on to each branch reactive site provide branches with substantially similar chain lengths and compositions extending from each branch end. The chain length will depend upon the amount of linear polymerization monomer added, whereas the composition will depend upon the monomer or mixture of monomers provided during linear polymerization.

The term "substantially similar" is based on a statistical average for all connected branch copolymer molecules produced. With regard to composition, homopolymer linear segments will provide identical compositions within a group of such segments. For random or block copolymer linear segments, the composition will vary somewhat between individual segments but will provide an overall average of similar copolymeric substitution typical of random or block copolymers. With regard to chain-length, most of the linear copolymerization segments will fall within a relatively narrow range of monomeric units per segment.

The average chain length of the linear polymer segments may vary, depending upon the reaction kinetics of the linear polymerization monomer utilized. With respect to the preferred alkylene oxide monomers, epoxide rings exhibit greater reactivity toward primary, as opposed to secondary, hydroxyl groups. As a consequence, the average chain length for linear polymer segments extending from branch ends with primary hydroxyl groups will be greater than the average chain length for linear polymer segments extending from branch ends having secondary hydroxyl groups.

The proportion of primary to secondary hydroxyl groups is also important in determining reaction kinetics. The presence of predominantly secondary hydroxyl groups will result in a lower probability for chain length extension from the single, terminal, primary hydroxyl group in each branched polymer segment.

Chain length reaction kinetics are also dependent upon the type of linear polymerization monomer. For example, ethylene oxide differs from the other alkylene oxides in that polymerization results in the production of primary hydroxyl groups, whereas polymerization of all the other alkylene oxides results in the formation of secondary hydroxyl groups. There will be correspondingly greater variation in chain length for ethylene oxide homopolymers and copolymers when such linear polymerization extends from a branched polymer segment containing predominantly secondary hydroxyl groups.

In addition, greater steric availability of the hydroxyl groups near the end of the branched polymer segments remote from the core segment provides greater reactivity, resulting in the higher probability of chain length extension than at those branch ends having relatively higher steric hindrance, due to their proximity to the center of the core compound.

Chain lengths within each group of linear polymer segments are therefore "substantially similar" when considering that these competing reaction kinetics will provide a statistical average of chain lengths over a large number of molecules. The extent of chain length formation will vary directly with the amount of linear polymerization monomer utilized.

The linear polymerization monomer may be any compound or mixture of compounds which undergoes linear polymerization initiated by reacting onto the functional groups at the branch ends of the branched core reactant. Such monomers include alkylene oxides; lactones; lactams; and thio derivatives of the foregoing compounds; alkylene carbonates; siloxanes; alkyleneimines; or monomers which undergo linear copolymerization, such as dicarboxylic acids with diols or diamines, to produce polyesters or polyamides respectively; diisocyanates and glycols producing polyurethanes; and so on, so long as the linear polymerization monomer contains a reactive group which can react with the branch end of the branched core compound. The linear polymer segment may be a block or random copolymer such as results from combinations of monomers capable of linear copolymerization.

Preferred linear polymerization monomers include alkylene oxides and co-monomer mixtures thereof, such as ethylene oxide, propylene oxide or mixtures thereof. The co-monomers may be added simultaneously to form a linear random copolymer segment, or sequentially to form a linear block copolymer segment.

The amount of linear polymerization monomers added may be from about 2 to about 600 moles, and preferably between 2 and about 350 moles, of linear polymerization monomer per branch end in the branched core compound.

Both branching and linear polymerization reaction steps may be carried out in the presence of suitable adjuvants, solvents, stabilizers, catalysts and other polymerization aids well known to those skilled in the art.

Various catalysts may be utilized in varying amounts, depending upon the type of polymerization being conducted and in particular upon the factors discussed below. Suitable catalysts include caustic materials, such as alkali or alkaline earth metals or their corresponding hydroxides and alkoxides; Lewis acids; mineral acids, and so on. Selection of specific catalysts is considered to be within the skill of the art. Crown ethers can be used as rate assisting agents.

The amount of catalyst employed during the branching and linear polymerization reaction steps is important for obtaining the connected branch copolymers. The amount of catalyst employed in the branching polymerization reaction step should be sufficient to effect substantially complete reaction of the core reactant with the non-crosslinking, branching polymerization monomer. Likewise, the amount of catalyst employed in the linear polymerization reaction step should be sufficient to effect substantially complete reaction of the branched core compound with the linear polymerization monomer, and to provide an essentially uniform distribution of linear polymerization monomer along each branch of the branched core compound. While not wishing to be bound by any particular theory, there is evidence to believe that the amount of catalyst is dependent upon (1) the total functionality of the non-crosslinking, branching polymerization monomer, (2) the particular core reactant employed in preparing the connected branch copolymers, and (3) the solubility and dissociation properties of the catalyst itself.

The total functionality ratio of the non-crosslinking, branching polymerization monomer, e.g., glycidol, based on the moles of catalyst can be determined according to the following formula:

$$T = M_m([M_m/M_c] + F)/M_t$$

wherein T is the total functionality ratio of monomer to catalyst; $M_m$, $M_c$ and $M_t$ are the numbers of moles of monomer, core and catalyst respectively; and F is the functionality of the core. As a typical illustration, in a reaction system containing 0.08 moles of difunctional core reactant, 0.49 moles of non-crosslinking, branching polymerization monomer and 0.06 moles of catalyst, the ratio of moles of catalyst to total functionality of non-crosslinking, branching polymerization monomer is 1:66.

The ratio of moles of catalyst to total functionality of non-crosslinking, branching polymerization monomer will vary for reaction systems employing different catalysts and different core reactants. For instance, for reaction systems employing sodium hydroxide as the catalyst and polyethylene glycol as the core reactant, the ratio of moles of catalyst to total functionality of non-crosslinking, branching polymerization monomer is preferably at least about 1:75. For reaction systems employing potassium hydroxide as the catalyst and random propylene oxide/ethylene oxide copolymer as the core reactant, the ratio of moles of catalyst to total functionality of non-crosslinking, branching polymerization monomer is preferably at least 1:38. For reaction systems employing potassium hydroxide as the catalyst and methoxy polyethylene glycol as the core reactant, the ratio of moles of catalyst to total functionality of non-crosslinking, branching polymerization monomer is preferably at least about 1:450.

It is believed that the difference in the minimum ratio values for reaction systems employing different catalysts and core reactants can be attributed to the ability of the various core reactants to solvate the catalyst ion pair, e.g., $RO^-K^+$, wherein $RO^-$ is the anion derived from the core reactant and $K^+$ is the potassium cation derived from the catalyst. The active species is the highly dissociated, highly solvated ion pair. If the ion pair is bound more tightly and is less solvated, more moles of catalyst would be required to shift the equilibrium sufficiently so as to obtain at least a similar number of dissociated ion pairs. Thus, the amount of catalyst employed in the branching and linear polymerization reactions is dependent upon the solubility and dissociation properties of the particular catalyst in the core reactant. Reaction systems employing polyethylene glycol as the core reactant generally solvate the ion pair well forming highly dissociated species. Reaction systems employing random propylene oxide/ethylene oxide copolymer in the core reactant generally solvate the ion pair less readily and therefore require more catalyst. It is expected that as the propylene oxide content of the core reactant increases, a concomitant increase in amount of catalyst will be required for the particular reaction system.

At ratios less than the minimum values for the particular catalyst and core reactant employed in preparing the connected branch copolymers, it has been found that the desired branching and linear polymerization reactions do not occur properly; therefore, the connected branch copolymers cannot properly be prepared at ratios less than the above minimum values. For example, when glycidol is used as the non-crosslinking, branching polymerization monomer in a reaction system containing a ratio of moles of catalyst to total functionality of non-crosslinking, branching polymerization monomer of less than the above minimum ratio values, bases exist to believe that homopolymerization of glycidol occurs thereby providing for the formation of an essentially linear polymer having a generally broad molecular weight distribution.

The branching and linear polymerization reactions may be conducted within a temperature range from about 50° C. to about 300° C., preferably from about 90° C. to about 150° C., and most preferably from about 100° to about 120° C. The reactions may be conducted under an inert atmosphere, at atmospheric or superatmospheric pressures, preferably from about 10 to about 200 psig, and most preferably from about 15 to about 65 psig.

The type or amount of catalyst, temperature, pressure and other polymerization parameters will vary depending upon the type of polymerization as discussed above, using those procedures, i.e., batch or continuous methods, well established in the prior art.

The polymerization reactions are generally conducted for a period of time sufficient to enable substantially all of the monomers to be consumed, i.e., for the polymerization to go to completion, i.e., exhaustion, so as to minimize monomer content in the connected branch copolymer product and to provide the desired connected branch copolymer. Depending upon the amount and type of monomers provided, the time will vary and may take 6 hours or more for each polymerization step. Overall reaction time to form a highly branched copolymer will usually be less than 64 hours, preferably less than 36 hours, and most preferably less than 8 hours, when the process involves a series of sequential polymerizations.

The branching polymerization monomers are preferably added slowly during the branching polymerization step in order to avoid monomer homopolymerization competing with polymerization on to the core reactant. The branching polymerization monomers are maintained at a temperature, prior to the addition thereof in the branching polymerization step, sufficient to avoid the formation of gel particles in the reaction mixture, e.g., oftentimes at a temperature below 30° C., preferably at a temperature of from about 0° to 10° C.

The two steps of branching and linear polymerizations may be repeated sequentially to the extent desirable and feasible in the particular reaction system used. Approximately 20 such repetitions is considered to be a practical maximum, although not limitative. Preferably the two steps are repeated from 1 to about 10 times. This repetition produces a connected branch copolymer consisting of alternating branched and linear polymer segments. The branching polymerization which occurs subsequent to a linear polymerization step entails reacting the branching polymerization monomer with the functional group at the end of the linear segments of the connected branch copolymer to provide a branch segment extending from each linear segment. The number of linear segments therefore increases with each subsequent branching step, such that the resulting branched copolymer may contain a large number of linear segments formed during the last polymerization step in a long series of polymerizations. As a result of the sequential polymerization steps, divalent linear segments are provided within the connected branch copolymer between branch segments. Monovalent linear segments are provided only by the last linear polymerization step. When the polymerization sequencing is ended with a branching polymerization step, the connected branch copolymer obviously contains only divalent linear segments. The connected branch copolymer will always contain two or more sets of linear polymer segments having substantially similar chain lengths and compositions within each set based upon a single linear polymerization step. When multiple linear polymerizations are conducted, however, the group of linear polymer segments formed during one polymerization step can be varied substantially from that of other, separate polymerization steps.

Thus, for example, when at least two branching polymerization steps and at least two linear polymerization steps are employed in their preparation, the connected branch copolymers will have a first group of divalent linear polymer segments containing terminal bonds connected to a second set of about $v(t-1)$ branched polymer segments each having an average of about say $t^1$ terminal bonds, each of the branched polymer segments in the second set being connected to a second set of linear polymer segments, with an average of $(t^1-1)$ linear polymer segments per set, wherein $t^1$ is greater than about two, providing a second group of about $(t^1-1)[v(t-1)]$ linear polymer segments in the second set, the linear polymer segments having substantially similar chain lengths within the second group.

The branching and linear polymerization reactions are conducted with sufficient agitation or mixing of the reaction ingredients so as to enable essentially all of the ingredients to be reacted, and to substantially reduce the formation of gel particles in the reaction mixture. Sufficient agitation of the reactor ingredients is necessary to provide branches with substantially similar chain length and composition. The polymerization reactions are conducted so as to maintain kinetic control and prevent diffusion control.

The connected branch copolymer may be recovered using procedures well established in the art, and may include subsequent processing steps, such as ion exchange, and/or neutralization using, for example, magnesium silicate, phosphoric acid, acetic acid or other well known neutralizing agents, in order to obtain the desired product in a stable form.

In a typical embodiment, a catalyzed core reactant is charged to a reactor at about 110° C. under 20 psig of nitrogen. The branching polymerization monomer or mixture of monomers maintained at a temperature below 10° C. is then added slowly to the reactor vessel with continuous agitation. The reaction is continued until substantially all the branching polymerization monomers have been consumed. The resulting product can then be isolated before undergoing additional polymerization or, if the linear polymerization can be conducted using the same catalyst, the linear polymerization monomer or monomer mixture can be added to the reactor vessel with continuous agitation, and the reaction allowed to go to completion.

If so desired, the branching and linear polymerizations are then repeated under similar conditions using the same constituents, or under different polymerization conditions, as required, if the branching or linear polymerization monomers are changed and require different reaction conditions. Once the polymerization reactions have been completed, the connected branch copolymer product is removed from the reactor vessel, and may be neutralized and recovered.

Using such a procedure, a connected branch copolymer is produced with a core segment, and relatively ordered portions of alternating branched and linear polymer segments. The term "connected branch copolymers" is derived from the structure of the copolymers used in the present invention containing branched polymer segments which are connected through a di- or polyvalent core segment and/or through divalent linear segments. As such the copolymers used in the compositions and processes of the present invention always have a connected branch structure. In one sense, each branched polymer segment having pendant linear polymer segments has a comb polymer structure wherein the branched segment represents the back of the comb with the linear segments forming the teeth. Viewed in this way, the copolymers used in the present invention can be regarded as connected comb polymers wherein the core segment and each divalent linear segment may end in comb substructures. The structures of the connected branch copolymers provide a unique molecular architecture quite different from the structures disclosed in the prior art. Examples of differing types of connected branch copolymers are shown and described in FIGS. 1–6 and the accompanying description of our aforementioned copending application Ser. No. 641,640. Preferred connected branch copolymers for use in this invention contain divalent linear polymer segments extending between separate branched polymer segments. Monovalent linear polymer segments provide the terminal portions of the polymer remote from the core segment. The end of the monovalent linear polymer segments may be provided with a reactive group, such as amino, carboxyl, siloxyl, phosphate or hydroxyl. Esters, salts and amides of acidic groups can also be used. Preferably, the terminal functional group is a hydroxyl group.

The core segment of the connected branch copolymer preferably has a linear or star structure. A linear core segment could be monovalent but preferably would be divalent with branching polymer segments at both terminal bonds. Representative examples of linear core segments include polysiloxanes, polyoxyalkylenes, polyphosphazines, polyalkylenes, polyethers, polyamides, polyurethanes and alkyl ethers. Star core segments are preferably polyethers derived from polyols such as glycerol, pentaerythritol, dipentaerythritol, trimethylol propane, trimethylol ethane; or disaccharides such as sucrose, glucose, mannitol or sorbitol.

Preferred branching polymer segments include polyamines and polyethers. A preferred branching polymer segment is a glycidyl polyether. Glycidyl polyethers derived from methyl glycidyl ether may also be employed.

Representative examples of linear polymer segments include polyethers, polyamines, polyphosphazines, or polysiloxanes. Preferred linear polymer segments include oxyethylene, oxypropylene, or random or block copolymers thereof.

The connected branch copolymers used in the invention have a core segment with a valence, v of greater than or equal to one and preferably two. The average valence of each branched polymer segment per set (t, t', t'' and so on, depending on the number of sets) is at least about 3, preferably between about 3 and about 50, and most preferably between about 3 and about 20.

Defined in terms of structural formula, the connected branch copolymers may be represented as:

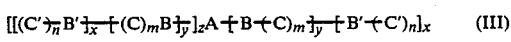  (III)

wherein A is a core segment having a valence of $z+1$; B and B, are non-crosslinked, branched polymer segments having valences of $m+1$ and $n+1$ respectively; C and C' are linear polymer segments having substantially similar chain lengths and composition within each group of x or y segments; m is greater than 1 and may vary between each set of y linear polymer segments; n is (1) greater then 1 or (2) may be 0 when y is greater than 0; x is (1) 1 when y is 0 or (2) m when y is 1 and the product of all m values when l is greater than 1; y and z are each integers greater than or equal to 0; provided that y is at least 1 when z is 0.

Formula III utilizes particular parenthetical notations. Covalent bonds between different segments which extend through parentheses or brackets designate serial repetitions, such that the polymer segments enclosed in the brackets having the y subscript represent a series of branched and linear segments repeating y times. Covalent bonds falling within the parenthetical notations, such as the bonds between the branched and linear polymer segments and within the braces, designate parallel repetitions. As such, the values for m, n and z define the number of bonds extending out from B, B' and A, respectively. In other words, m and n determine the valences of the branched polymer segments and z determines the valence of the core segment.

When viewed using the parameters in Formula III, the connected branch copolymers can be seen as containing a highly ordered arrangement of polymeric segments covering a wide variety of individual structures. The value y in Formula III equals the number of sequences in which the branching and polymerization steps have been repeated. The valence of the core segment, v, equals $z+1$. The valence of the branched polymer segments equals the corresponding m (or n) values$+1$.

A particularly preferred connected branch copolymer structure is:

(IV)

wherein A, B', and C' and n are as previously defined; y is 0; and z is 1. An example of a connected branch copolymer satisfying Formula IV is one which contains a divalent linear core segment.

The physical properties of the connected branch copolymers may be controlled by varying the types of reactants and monomers used to make up the various core, branch and linear segments of the polymer. A beneficial characteristic which may be provided by these connected branch copolymers, useful in such applications as interfacial agents, can be established by providing relatively distinct hydrophobic and hydrophilic portions of the polymer. For example, the core segment can be made up of a relatively high molecular weight hydrophobic polymer, whereas the sets of linear polymer segments may be comprised of hydrophilic polymers, or vice versa. Due to the presence of a series of linear polymer segments, the linear segments portion of the polymer may provide an effective solvating means for a compound or a particle having a similar hydrophilicity to the linear segments within an otherwise hydrophobic environment similar to the hydrophobicity of the core segment.

Another characteristic of the connected branch copolymers relates to their capacity to provide a large number of functional groups at the free ends of the terminal linear polymer segments remote from the core compound. Due to the relative symmetry of the connected branch copolymer having linear polymer segments of substantially similar chain lengths and compositions within each set, a relatively large concentration of functional groups may be provided in a small area such that the polymer may act as a carrier for compounds which have the capacity to be associated with these functional groups. If the functional groups are hydroxyl groups or other groups capable of effecting hydrogen bonding, the association may be in the form of hydrogen bonding. If the functional groups are ionic species, the association may be in the form of ionic bonds.

As a result of the wide variety of characteristics which the connected branch copolymers may be prepared to have, these polymers may be useful in many applications. For example, in uses where viscosity control is of interest, viscosity is found to be one property of the connected branch copolymers which demonstrates an unexpected and advantageous distinction over similar polymers set forth in the prior art. Polyalkylene oxide connected branch copolymers have been shown to have lowered viscosities when compared to linear or star polyalkylene oxide polymers of similar molecular weight. Randomly branched polymers show a propensity for lowered viscosities similar to that of the connected branch copolymers, but significant differences exist between these two types of structures. In this regard, the connected branch copolymers may be designed to provide for a wide range of viscosities beyond the limits of the random branching structures, as well as lower viscosities than that which can be achieved through random branching. In addition, other properties can be varied, such as water solubility, to provide for completely water-miscible polymers as distinguished from the partially water-soluble, randomly branched prior art structures with similar molecular weight and composition.

Control of viscosity for high molecular weight polymers can be achieved through modification of chain length within a given composition. Linear polymers show an increase in viscosity with increasing molecular weight. Correspondingly, star polymers with the same polymer composition show a similar increase in viscosity with increase in molecular weight, but have correspondingly lower viscosities than the linear polymer structures. Connected branch copolymers show an even greater reduction in viscosity at the same molecular weight than the viscosity values of corresponding linear and star polymers.

Although not wishing to be bound to any particular theory, this phenomenon may be due to the shorter chain lengths of the connected branch copolymers when compared with the single chain length of the linear polymer, or the relatively few chain lengths of the star polymer, having similar molecular weights. A discussion of polymer viscosity may be found in an article entitled "Viscosity—Molecular Weight—Temperature—Shear Rate Relationships of Polymer Melts: A Literature Review," by N. G. Kumar, in the *Journal of Polymer Science: Macromolecular Reviews*, Volume 15, at pages 255–325 (1980). According to one theory, viscosity increases gradually with increasing chain length up to a critical point where chain length is sufficient to create chain entanglement, thereafter causing a significant increase in viscosity for increasing molecular weight. By providing highly branched structures, the critical point for chain entanglement can be extended significantly to much higher molecular weights, causing a significant reduction in viscosity for highly branched polymers when compared with linear or star polymers. Conversely, the connected branch copolymers can be provided with fewer and longer chain lengths, thereby approaching the structures and viscosities of the star polymers.

Randomly branched polymers can achieve a similar effect to some degree by varying the concentration of branching polymerization monomer in the bulk polymerization with the linear polymerization monomer. Randomly branched polymers, however, do not provide the flexibility in varying viscosity over a wide range, presumably since the orientation of linear segments within randomly branched polymers cannot be as readily varied as the chain length and orientation of linear segments in connected branch copolymers. Instead, randomly branched polymers inherently contain a wide variety of chain lengths of both branching and linear segments. Furthermore, randomly branched polymers show a dependence between viscosity and the amount of branching polymerization monomer provided, in that at higher molecular weights greater concentrations of branching polymerization monomer provide relative reductions in viscosity.

In contrast, the connected branch copolymers have no viscosity dependence upon the concentration of branching polymerization monomers within the polymer, and are therefore qualitatively distinct from randomly branched polymers with regard to viscosity control. There is, however, a viscosity relationship established for connected branch copolymers with respect to the amount of branching provided, such that greater branching will generally result in lowered viscosities. In addition, the critical point of chain entanglement in connected branch copolymers may be extended significantly beyond the critical points of the other polymer structures to provide lower viscosities at higher molecular weights than has heretofore been achieved.

The connected branch copolymers used in the present invention also possess an unexpected and potentially useful property shown by an increase in viscosity for a reduction in molecular weight when the chain length of the monovalent linear polymer segments is reduced towards zero. This increase in viscosity may be the result of the interaction between the functional groups among the copolymer molecules or with the suspending medium. For example, when the functional groups are hydroxyl they may interact with the water molecules in an aqueous system resulting in a viscosity increase as the molecular weight is reduced. This is in sharp contrast to the general rule that decreases in molecular weight will always result in lowering viscosity for these kinds of polymers. This effect also demonstrates the potential for the connected branch copolymer structures at lower molecular weight ranges to exhibit additional properties and utility due to the presence of such a large concentration of functional groups.

Now that the connected branch copolymers, and the methods for their preparation, described in our aforementioned copending application Ser. No. 641,640, have been described, the special requirements imposed on the connected branch copolymers by their use in the processes and compositions of the present invention, and the preferred types of connected branch copolymers for use in such compositions and processes, will be described.

As already mentioned, in the lubricating method of the present invention, the lubricant compositions used comprise an aqueous solution of a connected branch copolymer having a group of terminal linear polymer segments bearing terminal groups capable of hydrogen bonding. It has been found that such lubricant compositions containing the connected branch copolymers have viscosities which decrease more slowly as the proportion of water in the lubricant compositions increases than does the viscosity of similar aqueous lubricant compositions using the prior art linear or star polyalkylene glycols. Thus, the lubricating method of the present invention permits the use of lubricant compositions containing higher proportions of water, and thus smaller proportions of polymer, than prior art polyalkylene glycol based lubricant compositions. Since the polymer is the most expensive component of the lubricant composition, the ability to use lubricant compositions containing higher proportions of water renders the method and compositions of the invention more economical than similar methods and compositions using prior art polyalkylene glycol polymers. Furthermore, increasing the proportion of water in the lubricant compositions reduces the flammability thereof, an important safety consideration in certain processes, e.g. metal cutting, in which such lubricant compositions may be employed. It is shown in the Examples below that useful lubricant compositions can be prepared containing 10 percent or less of the connected branch copolymers.

Although the proportions of water, connected branch copolymer and co-solvent (if such a co-solvent is present, as discussed in more detail below) for use in the methods and compositions of this invention will of course vary with the exact connected branch copolymer used, and upon the severity of the conditions under which the lubricant compositions is to be used, in general, it is preferred that the lubricant compositions used in the method of the invention comprise from about 2 to about 40 percent by weight of the connected branch copolymer and from about 98 to about 60 percent by weight of water. For economic reasons, it is usually preferred to avoid using more than about 20 percent by weight of the connected branch copolymer in the aqueous composition, while in many cases, in order to ensure proper lubricating performance with a reasonable margin for error, it will be desirable to use at least 5 percent by weight of the connected branch copolymer.

The lubricant compositions used in the method of the invention may be simple aqueous solutions of the connected branch copolymer comprising only the connected branch copolymer and water. However, as with the prior art polyalkylene glycol based lubricant compositions discussed above, the lubricant compositions of this invention may also contain a co-solvent, the preferred co-solvent being an alkylene glycol, especially ethylene or diethylene glycol. When an alkylene glycol is present as a co-solvent for the connected branch copolymer, the lubricant composition preferably comprises at least 40 percent by weight of water, from 50 to 55 percent by weight of the alkylene glycol and from 2 to 40 percent by weight of the connected branch copolymer, the especially preferred lubricant compositions being those comprising from 45 to 70 percent by weight of water, 25 to 50 percent of the alkylene glycol and from 5 to 25 percent by weight of the connected branch copolymer. The lubricant composition may also contain other conventional additives, such as anti-oxidant, anti-wear, anti-corrosion, and extreme pressure additives, and the like.

Desirably, in the methods and compositions of the present invention, the lubricant composition is chosen so that it has a viscosity of at least 30 centistokes at 40° C. and a viscosity/pressure coefficient of at least $2.8 \times 10^{-4}$ atm$^{-1}$ at 25° C., since it has been found that lubricant compositions meeting these criteria have good lubricating ability. As shown in the Examples below, by appropriate choice of the desired parameters of the connected branch copolymers the lubricant compositions of the invention can be made to have viscosity/pressure coefficients at 25° C. in excess of $3.6 \times 10^{-4}$ atm.$^{-1}$, a value approximately 20 percent higher than that achieved in similar compositions using the linear polyalkylene glycols now used commercially in such lubricant compositions.

As already mentioned, the connected branch copolymers used in the methods and compositions of the present invention may have either a single group of branched polymer segments and a single group of linear polymer segments, or a plurality of groups of branched polymer segments and linear polymer segments alternating as one progresses outwardly from the core segment, provided only that in either case the terminal group of linear polymer segments bear terminal groups capable of effecting hydrogen bonding. For example, if the connected branch copolymer has two groups of linear polymer segments only the second, terminal group of linear polymer segments need bear terminal groups capable of effecting hydrogen bonding. For reasons of solubility it is normally be desirable that all the linear polymer segments present in the connected branch copolymer comprise polyoxyalkylenes. Both the type of connected branch copolymer having only a single group of branched polymer segments and a single group of linear polymer segments, and the type having multiple groups of both types of segments, may be used in the methods and compositions of the present invention. Although, because of the ease with which they can be synthesized, and because of the simplicity of investigating their changes in properties with changes in the molecular architecture of the connected branch copolymers, the experimental work described in the Examples below was conducted with connected branch copolymers having only a single group of branched polymer segments and a single group of linear polymer segments, there are good theoretical reasons to believe that, with appropriate design, the type of polymer having multiple groups of branched polymer segments and multiple groups of linear polymer segments could give better performance in the methods and compositions of the invention. This type of connected branch copolymer tends to have a very large number of linear polymer segments in the outermost group and consequently would be expected to assume, in an aqueous lubricant composition, a substantially spherical or ellipsoidal conformation which would be expected to be highly resistant to compression. The presence of such compression resistant spheroids or ellipsoids in an aqueous lubricant composition should give the lubricant composition a high viscosity/pressure coefficient. However, as shown in the examples below, satisfactory lubricating properties, including relatively high viscosity/pressure coefficients can be achieved using connected branch copolymers in which the core segment has a linear or star structure and in particular using connected branch copolymers having a divalent linear core segment connecting two polyvalent, non-crosslinked, branched polymer segments, which are in turn connected to two sets of terminal linear polymer segments.

Because of the relatively large number of properties which must be controlled to achieve good performance in a lubricant composition, the optimum design for a connected branch copolymer to be used in the methods and compositions of the present invention is by no means simple, and indeed the optimum molecular design may vary from application to application depending upon the particular constraints imposed in any particular set of circumstances encountered in practical use of the lubricant compositions. For example, the connected branch copolymer should have high water solubility so that it readily dissolves in the water and any co-solvent used in the lubricant composition. Because the methods of the present invention may often be practiced by shipping the connected branch copolymer neat, or admixed with only a minimal amount of water, and then preparing the lubricant composition at the place where it is to be employed, consideration must be given not only to the properties of the ready-to-use lubricant composition but also to the properties of the neat connected branch copolymer, or at least highly concentrated aqueous solutions thereof. Accordingly, the neat connected branch copolymer should have a reasonably low pour point in order to enable it to be handled on site at ambient temperature, and should not have so high a viscosity as to make handling of the neat copolymer impracticable, although of course relatively high viscosity is desirable in the final ready-to-use lubricant composition. Finally, the ready-to-use lubricant composition desirably has a low surface tension in order to avoid excessive foaming during use.

As shown in detail in the Examples below, the variation in physical properties with the molecular architecture of the connected branch copolymers used in the methods and compositions of the invention is not simple. However, in general, the neat viscosity of the connected branch copolymers increases with increasing molecular weight of the core segment and/or linear polymer segments. However, in view of the fact that high molecular weight in the polymer is desirable in lubricant compositions, it is an important advantage of the connected branch copolymers that the molecular weight of a connected branch copolymer having a given neat viscosity is normally much greater (typically three times greater) than similar prior art linear or star polymers having the same neat viscosity. Moreover, the dilution viscosity of the connected branch copolymers (i.e. the proportion of the neat viscosity retained at any particular dilution) is higher than that of similar linear or star polymers. For example, it has been found that selected connected branch copolymers can be made to retain up to 42 percent of their neat viscosity when diluted with four times their own weight of an ethylene glycol/water mixture, and up to 45 percent of the neat viscosity when diluted with four times their weight of water. Also, because of the relatively large numbers of groups capable of effecting hydrogen bonding which can be carried on the terminal linear polymer segments of the connected branch copolymers, the connected branch copolymers can have a much higher molecular weights at any given concentration of hydrogen-bonding groups per unit molecular weight.

Also, as shown in the Examples below, the pour point of the connected branch copolymers decreases as the number of terminal linear polymer segments therein increases, while the viscosity/pressure coefficient of the connected branch copolymers increases with both increasing size and molecular weight of the core segment, and increasing number of terminal linear polymer segments. However, the viscosity/pressure coefficient does not appear to be substantially affected by the molecular weight of the linear polymer segments.

As already noted, the mathematical relationships between the physical properties of lubricant compositions of the present invention containing connected branch copolymers, and the molecular architecture of the copolymers themselves, is explored in more detail in the Examples below. However, having regard to the general relationships discussed above, it is preferred that the core segment of the connected branch copolymers used in the methods and the compositions have a number average molecular weight in the range of from 2000 to 10000, and preferably 3200 to 6400. The connected branch copolymer is typically relatively highly branched, having from about 8 to about 30 terminal linear polymer segments in each molecule, the optimum number of such terminal linear polymer segments usually being about 15. The terminal linear polymer segments preferably have a number average molecular weight of at least 4000, the optimum molecular weight apparently being about 6400.

The choice of monomers incorporated into the connected branch copolymers used in the methods and compositions of the present invention is determined largely be the desirability of making the connected branch copolymers highly soluble in water. The connected branch copolymers are desirably organic polymers comprising only the elements carbon, hydrogen, oxygen, nitrogen, phosphorus and silicon, and preferably only the elements carbon, hydrogen, oxygen and nitrogen. It is preferred that the core segment of the connected branch copolymers be an oxyalkylene homopolymer, or a random or block copolymer of an oxyalkylene, the especially preferred oxyalkylene polymer being an ethylene oxide/propylene oxide copolymer. If desired, the linear core segment may further comprise a glycidyl polyether derived from methyl glycidyl ether. The branched polymer segments of the connected branch copolymer preferably comprise polyethers or polyamines, desirably glycidyl polyethers, most desirably glycidyl polyethers derived from glycidol itself. It does not appear to be necessary to reduce the branch density of the branched polymer segments in the connected branch copolymers used in the methods and compositions of the present invention, but if such reduction in branch density is desired, it may appropriately be affected by copolymerizing the glycidol with an alkylene oxide or mixture of alkylene oxides, preferably an ethylene oxide/propylene oxide mixture.

The terminal linear polymer segments of the connected branch copolymers used in the methods and compositions of the present invention bear groups capable of effecting hydrogen bonding. Appropriate groups capable of effecting hydrogen bonding include, for example, carboxylic acid groups, esters, salts and amides of carboxylic acid groups, amino groups, phosphate groups, esters, salts and amides of phosphate groups, and hydroxyl groups. Hydroxyl terminal groups are preferred because of their strong hydrogen bonding and water-solubilizing properties. Futhermore, it is preferred that the terminal linear polymer segments of the connected branch copolymer be hydroxyl-terminated polyoxyalkylene linear polymer segments since such linear polymer segments provide good hydrogen-bonding properties and can readily be prepared from inexpensive monomers. Also, as already noted, where more than one group of linear polymer segments are present in the connected branch copolymers, desirably all the groups of linear polymer segments comprise polyoxyalkylenes. The polyoxyalkylene linear polymer segments may be oxyalkylene homopolymers or random or block copolymers of two or more alkylene oxides, the preferred form of linear polymer segment being an ethylene oxide/propylene oxide random copolymer. The linear polymer segments may further comprise a glycidyl polyether derived from methyl glycidyl ether.

The following Examples are now given, though by way of illustration only, to show particularly preferred methods and compositions of the invention, and to illustrate the way in which the physical properties of the lubricant compositions of the invention vary with the molecular architecture of the connected branch copolymer contained therein.

EXAMPLE 1

This Example illustrates the preparation of a connected branch copolymer useable in the methods and compositions of the present invention. This connected branch copolymer has a divalent core segment which is a random ethylene oxide/propylene oxide copolymer and which has a molecular weight of approximately 5000, branched polymer segments comprising glycidol residues, and a total of approximately 26 linear polymer segments each comprising a random ethylene oxide/propylene oxide copolymer in which the molar ratio of ethylene oxide to propylene oxides is 85:22, and each of which has a molecular weight of approximately 5000.

422 g. of UCON Fluid 75-H-1400 (a commercially-available linear random ethylene oxide/propylene oxide copolymer produced by Union Carbide Corporation an having a molecular weight of approximately 2000; UCON is a Registered Trademark of Union Carbide Corporation) was placed in a container and a solution of 2.63 g. of potassium hydroxide in 100 g. of ethanol added. The alcohol and the water (coproduced) were removed under reduced pressure at 100° C. 415 g. of the resultant core reactant were charged to a half gallon (1.91.) autoclave which was heated to 110° C. and filled with a nitrogen atmosphere at 20 psig. While maintaining these conditions of pressure, atmosphere and temperature, 957 g. of ethylene oxide and 343 g. of propylene oxide were slowly fed simultaneously to the autoclave at a rate of 3 parts by weight of ethylene oxide to 1 part by weight of propylene oxide. The resultant polymerization reaction was allowed to proceed to completion and all the resultant polymer removed from the reactor. To 350 g. of this intermediate polymer was added a solution The alcohol and water were removed from the resulting reactant under reduced pressure at 100° C. and 342 g. of the resultant reactant wire charged to the same autoclave as before. Next, 107 g. of glycidol were added slowly to the autoclave and the resulting polymerization reaction allowed to proceed to completion. A mixture of 117 g. of ethylene oxide and 39 g. of propylene oxide was then fed as before to the autoclave and the polymerization reaction allowed to proceed to completion. The resultant polymer was removed from the half-gallon autoclave and charged to a 2-gallon (7.61.) autoclave, which was then heated to 110° C. and held under a nitrogen atmosphere at 20 psig. While maintaining the autoclave under these conditions, a mixture of 1392.5 g. of propylene oxide and 4177.5 g. of ethylene oxide was fed to the autoclave as above and the resulting polymerization reaction allowed to proceed to completion. 4921 g. of the resultant polymer were then removed from the autoclave, and a mixture of 750 g. of propylene oxide and 2250 g. of ethylene oxide were fed to the autoclave under the same conditions as before and the resulting polymerization reaction allowed to proceed to completion to produce the final connected branch copolymer. All of the resultant connected branch copolymer was removed from the autoclave and stored under nitrogen until it was used in the experiments described in Example 3 below, in which it is referred to as connected branch copolymer 1.

EXAMPLE 2

This Example illustrates the preparation of a second connected branch copolymer useable in the methods and compositions of the present invention. This connected branch copolymer has a divalent core segment which is a random ethylene oxide/propylene oxide copolymer and which has a molecular weight of approximately 5000, branched polymer segments comprising glycidol residues and a total of approximately 8 linear polymer segments each comprising a random ethylene oxide/propylene oxide copolymer in which the molar ratio of ethylene oxide to propylene oxide is 85:22, and each of which has a molecular weight of approximately 5000.

A solution of 2.63 g. of potassium hydroxide in 100 g. of ethanol was added to 422 g. of UCON Fluid 75-H-1400. The alcohol and the water produced by the reaction were removed under reduced pressure at 110° C. 412 g. of the resulting core reactant were charged to a half-gallon (1.91.) autoclave, which was heated to 110° C. and maintained under a nitrogen atmosphere at a pressure of 20 psig. A mixture of 930 g. of ethylene oxide and 311 g. of propylene oxide was fed slowly to the autoclave and the resultant polymerization reaction allowed to proceed to completion. All of the resultant intermediate polymer was removed from the autoclave and stored under nitrogen.

A solution of 7.6 g. of potassium hydroxide in ethanol was added to 221 g. of the intermediate polymer and the water and alcohol removed under reduced pressure at 110° C. 206 g. of the resulting core reactant were charged to the same half-gallon autoclave, which was again heated to 110° C. and held under a nitrogen atmosphere at 20 psig. 19 g. of glycidol were slowly fed to the autoclave and the resultant polymerization reaction allowed to proceed to completion. Next, a mixture of 1028 g. of ethylene oxide and 342 g. of propylene oxide was fed slowly to the reactor and the resultant polymerization reaction allowed to proceed to completion. All of the resulting second intermediate polymer was removed from the reactor.

A solution of 1.9 g. of potassium hydroxide in ethanol was added to 410 g. of the second intermediate polymer prepared a described above and the water and ethanol removed under the same conditions as before. 389 g. of the resulting core reactant were charged to the same half-gallon autoclave and a mixture of 458.6 g. of ethylene oxide and 150.1 g. of propylene oxide was fed slowly to the autoclave and the resultant polymerization reaction allowed to proceed to completion. A 40 g. sample of the resulting intermediate polymer was removed for a viscosity check, then a mixture of 33 g. of ethylene oxide and 11 g. of propylene oxide was fed to the autoclave and allowed to react to completion. A second 40 g. sample of the product was removed for a viscosity check. Finally, a mixture of 30 g. of ethylene oxide and 10 g. of propylene oxide was fed to the autoclave and allowed to react to completion, then a third 40 g. sample of material was removed from the autoclave for a viscosity check. When this viscosity check showed that the desired viscosity had been achieved, all the connected branch copolymer was removed from the autoclave and stored under nitrogen.

The later stages of the preparation, starting from the second intermediate polymer, were repeated four times and the resultant batches of connected branch copolymer blended together and stored under nitrogen prior to their us in the experiments described in Example 3 below, in which the blended polymer is designated connected branch copolymer 2.

EXAMPLE 3

This Example describes experiments to measure the physical, and especially the lubricating, properties of connected branch copolymers 1 and 2 prepared in examples 1 and 2 above respectively.

The number average molecular weight of connected branch copolymer 1 was calculated to be 95961 grams per mole. The polymer contained 9.1 percent glycidol and 5.3 percent residual unsaturation. The neat viscosity was found to be 94489 Saybolt universal seconds (sus.) at 37.8° C., and the viscosity of a 50 percent aqueous solution at 25° C. was found to be 7436 sus. The viscosity/pressure coefficient of a lubricant composition containing 20 percent by weight of this connected branch copolymer, 35 percent of ethylene glycol and 45 percent of water was found to be $3.09+0.25\times10^{-4}$atm.$^{-1}$ at 25° C. and $3.60+0.36\times10^{-4}$atm.$^{-1}$ at 38° C. using a Ruska High Pressure Viscometer manufactured by Ruska Instruments Corporation, Model No. 1602-811-00, and the method set out in the manufacturer's manual.

The number average molecular weight of connected branch copolymer 2 was found to be 45796 This connected branch copolymer had a pour point of 0° C., a water solubility of 100 percent by weight at 25° C. and contained 1 percent by weight of glycidol. Its neat viscosity was 97421 sus. at 37.8° C. and 185409 sus. at 25° C. The viscosity of a 50 percent aqueous solution at 25° C. was 3472 sus. The viscosity/pressure coefficient of connected branch copolymer 2, again determined in a composition containing 20 percent by weight of the connected branch copolymer, 35 percent by weight of ethylene glycol and 45 percent by weight of water was found to be $3.17+0.25\times10^{-4}$atm.$^{-1}$ at 25° C., $3.38+0.36\times10^{-4}$atm.$^{-1}$ at 38° C. and $3.90+0.48\times10^{-4}$aatm.$^{-1}$ at 65° C..

The dilution viscosities of both connected branch copolymers 1 and 2 were then determined by measuring the viscosities of various solutions containing the connected branch copolymers and water, together with, in some cases, ethylene glycol as a co-solvent. The proportions of connected branch copolymers 1 and 2, water and ethylene glycol, and the viscosities of the resultant compositions are shown in Table I below.

TABLE I

| Component | Concentration (Wt. %) | | | | |
|---|---|---|---|---|---|
| CBC 1 | 10 | 10 | 20 | — | — |
| CBC 2 | — | — | — | 10 | 10 |
| H$_2$O | 90 | 45 | 40 | 90 | 45 |
| Ethylene Glycol | — | 45 | 40 | — | 45 |
| Viscosity cSt. at 40° C. | 5.7 | 16.0 | 68.3 | 5.10 | 13.9 |

As previously mentioned, it is desirable that an aqueous lubricant composition have a viscosity of at least 30 cSt. at 40° C. Accordingly, it will be seen that the composition comprising 20 percent by weight of connected branch copolymer 1, 40 percent by weight of water and 40 percent by weight of ethylene glycol would be suitable for use under practical conditions. The viscosities of the compositions containing 10 percent by weight of connected branch copolymer 1 or 2, 45 percent by weight of water and 45 percent by weight of ethylene glycol are somewhat low for use under practical conditions, but intrapolating from the data in Table I, it seems reasonable to believe that compositions containing approximately 15 percent by weight of connected branch copolymer 1 or 2, 42.5 percent by weight of water and 42.5 percent by weight of ethylene glycol would have the necessary viscosity for use in under practical conditions.

To provide a test of a lubricant composition of the present invention under practical conditions, a lubricant composition was prepared containing connected branch copolymer 1 in an ethylene glycol/water mixture to which was added an additive system previously used in water-based lubricant compositions containing polyalkylene glycol polymers. The lubricant composition comprised, by weight, 15 percent of connected branch copolymer 1, 40 percent of water, 1.2 percent of amine 270, 12 percent of capric acid, 0.8 percent of morpholine and 0.06 percent of tolyltriazole, the remainder being ethylene glycol. To provide a control composition having approximately the same viscosity at 40° C., similar lubricant compositions were formulated using the same water/ethylene glycol/additive system mixture, but containing 18 percent by weight of UCON Fluid 75-H-90000 and 14.1 percent by weight of UCON Fluid 75-H-380000 respectively. Both 75-H-90000 and 75-H-380000 are essentially linear random ethylene oxide/propylene oxide copolymers sold commercially by Union Carbide Corporation for use in water-based lubricant compositions; these polymers have neat viscosities of approximately 90000 and 3800000 sus. respectively at 37.8° C.

Each of the lubricant compositions was tested under moderate conditions for 100 hours in a Vickers V-104 vane pump at a pumping rate of 8 gallons (30.2 liters) per minute at 65° C. at a pressure of 15000psig. (10.34 MPa. gauge) using a 10 micron filter and 5 liters of the lubricant composition. The wear rate and viscosity loss during the test were measured, and are shown in Table II below.

was almost equal to that of a 14.1 percent solution of 75-H-380000.

EXAMPLE 4

This Example reports the results of systematic experiments carried out to determine the relationship between the molecular weight of the core segment, the number of branches and the molecular weight of the linear polymer segments and the physical properties of the connected branch copolymers used in the methods and compositions of the present invention.

Connected branch copolymers were synthesized in substantially the same manner as in Examples 1 and 2 above using a 75 weight percent ethylene oxide/25 weight percent propylene oxide mixture as the monomer mixture used to form the core and linear polymer segments, and using glycidol as the branching polymerization monomer to form the branched polymer segments. Linear core segments having average molecular weights of 88, 600 and 1000 were used. 3, 6 or 12 moles of glycidol were polymerized onto each end of the linear core segment, thereby producing polymers having 8, 14 or 26 total branches. The molecular weight of each linear polymer segment was 88, 600 or 1000. The combinations of core segment, number of branches and linear polymer segments are shown in Table III below.

TABLE III

| Polymer Designator | Core Segment Molecular Weight (Average) | Total Branches | Each Linear Segment Molecular Weight (Average) |
|---|---|---|---|
| 600-8-88 | 600 | 8 | 88 |
| 600-14-1000 | 600 | 14 | 1000 |
| 600-26-6000 | 600 | 26 | 600 |
| 1000-14-600 | 1000 | 14 | 600 |
| 1000-26-88 | 1000 | 26 | 88 |
| 1000-8-1000 | 1000 | 8 | 1000 |
| 5000-26-1000 | 5000 | 26 | 1000 |
| 5000-8-600 | 5000 | 8 | 600 |
| 5000-14-88 | 5000 | 4 | 88 |

For each of the nine connected branch copolymers, the molecular weight was measured by determining the hydroxyl number. The water solubility was also measured, as was the surface tension and cloud point of a 1 percent aqueous solution of the connected branch co-

TABLE II

| | VANE PUMP WEAR TEST COMPARISONS | | | |
|---|---|---|---|---|
| | | | Vane Pump Test Results | |
| POLYMER | Weight Percent In Lubricant Composition | Viscosity cSt @ 40° C. | Wear Rate mg/hr | Percent Viscosity Loss |
| CBC 1 | 15 | 40 | 0.5 | nil |
| 75-H-90,000 (Control) | 18 | 41 | 0.5 | nil |
| 75-H-380,000 | 14.1 | 42 | 0.5 | nil |

From the data in Table II, it will be seen that the lubricant composition of the present invention gave results equal to those achieved with the prior art compositions, even though it contained a substantially smaller proportion of polymer. The data in Table II also illustrate the improved dilution viscosity of the connected branch copolymers as compared with prior art linear polymers formed from the same monomers; although connected branch copolymer 1 has a neat viscosity of only 95,000 sus., only one-fourth that of 75-H-380000, the viscosity of the lubricant composition containing 15 percent of the connected branch copolymer 1 polymer. The viscosities of the connected branch copolymers were measured neat at 25° C. and 37.8° C., and in 50 percent aqueous solution at 25° C., using a Cannon-Fenske viscometer. The results are shown in Table IV below, together with the percent by weight glycidol in each connected branch copolymer. For comparison, similar measurements for each of four prior art linear polyalkylene glycol polymers intended for use in aqueous lubricant compositions are included in the Table. These four prior art polymers are the UCON Fluids 75-H-90000 and 75-H-3800000 described in Example 3 above, and the similar, but lower molecular weight, UCON Fluids 75-H-450 and 75-H-1400, which have neat viscosities at 37.8° C. of 450 and 1400 sus. respectively under typical practical conditions, in which the lubricant composition will usually be at about 30° C.–40° C.

TABLE IV

| Polymer | Number Average Molecular Weight | Water Solubility | Surface Tension dynes/cm 1% aq. soln. | Cloud Points °C. 1% aq. soln. | Viscosity (sus) | | | % Wt. Glycidol |
|---|---|---|---|---|---|---|---|---|
| | | | | | neat 25° C. | neat 37.8° C. | 50% aq. soln. 25° C. | |
| 600-8-88 | 4.1 | Complete | 55.0 | 200 | 8421 | 4125 | 147 | 10.9 |
| 600-14-1000 | 15.1 | Complete | 52.3 | 95 | 7899 | 4403 | 627 | 5.9 |
| 600-26-600 | 17.6 | Complete | 52.0 | 99 | 7566 | 3682 | 462 | 10.1 |
| 1000-8-1000 | 10.4 | Complete | 54.0 | 96 | 7758 | 4057 | 497 | 4.3 |
| 1000-14-600 | 10.6 | Complete | 54.0 | 100 | 7365 | 3692 | 546 | 8.4 |
| 1000-26-88 | 13.8 | Complete | 56.0 | >200 | 45015 | 16103 | 251 | 12.9 |
| 5000-8-600 | 10.4 | Complete | 43.5 | 92 | 15988 | 7643 | 815 | 4.3 |
| 5000-14-88 | 8.4 | 90% | 51.0 | 96 | 99217 | 53715 | 645 | 10.5 |
| 5000-26-1000 | 27.3 | Complete | 49.0 | 90 | 35537 | 18826 | 2400 | 6.5 |
| 75-H—450 (Control) | 0.90 | Complete | 48.0 | >200 | 836 | 450 | 106 | — |
| 75-H-1400 (Control) | 2.2 | Complete | 38.6 | >200 | 2587 | 1400 | 255 | — |
| 75-H-90,000 (Control) | 10.3 | Complete | 51.5 | 86 | $1.76 \times 10^5$ | 96382 | 3700 | — |
| 75-H-380,000 (Control) | 23.4 | Complete | -not measured- | | $8.66 \times 10^5$ | $3.97 \times 10^5$ | 11401 | — |

From the data in Table IV it will be seen that all the connected branch copolymers except 5000-14-88 were completely soluble in water, and even 5000-14-88 was 90 percent soluble, a degree of solubility which would not cause any problems in ready-to-use lubricant compositions of the present invention. The surface tensions of the 1 percent aqueous solutions of the connected branch copolymers are comparable to those of the prior art polymers and are sufficiently high that excessive foaming should not be a problem under practical conditions of use. The cloud points of the 1 percent aqueous solutions of the connected branch copolymers vary with the length of the linear polymer segments and, most important, with the length of the core segment. In the connected branch copolymers having very short linear polymer segments (i.e. 600-8-88 and 1000-26-88), the cloud points are extremely high, presumably owing to a higher degree of hydrogen bonding. As the linear polymer segments are made longer, so that hydrogen bonding is no longer significant, the cloud points are lowered. In the special case of the 5000-14-88 connected branch copolymer, in which the relative molecular weights of the various parts of the polymer are atypical, the 5000 molecular weight core segment comprises 60 percent of the total molecular weight of the polymer and thus is the determining factor for both the cloud point and solubility. The cloud points for all the connected branch copolymers shown in Table IV are greater than that for the commercially-used UCON Fluid 75-H-90000 prior art polymer, and are thus sufficiently high that separation of aqueous solutions of the connected branch copolymers should not be a problem Except for the relatively atypical 5000-14-88 connected branch copolymer, the neat viscosities of the connected branch copolymers shown in Table IV are lower, in most cases by a factor of 2-3, than the expected values for linear polyoxyalkylene copolymers, as determined by intrapolation between the four prior art linear polyoxyalkylene polymers listed at the end of Table IV. This is more readily seen in FIG. 1 of the accompanying drawings, wherein the logarithm of the neat viscosity (in sus.) at 37.8° C. is plotted against the logarithm of the number average molecular weight.

The reduction in viscosity at a given molecular weight achieved by the connected branch copolymers, as compared with similar linear polymers, or alternatively the increase in molecular weight at a given viscosity achieved by the connected branch copolymers as compared with the linear polymers, is also shown in Table V below, which shows the ratio of the viscosity of the linear polymer to the viscosity of the connected branch copolymer of the same molecular weight (the viscosities of the (hypothetical) linear polymers being based on the linear polymer viscosity curve shown in FIG. 1), together with the ratio of the molecular weight of the linear polymer to the molecular weight of the connected branch copolymer having the same viscosity, and the reciprocal of the latter ratio.

TABLE V

| Polymer | Number Average Molecular Weight × $10^3$ | Neat Viscosity 37.8° C. sus | Viscosity Linear Polymer/ Viscosity Connected Branch Copolymer | Mol. Wt. Linear Polymer/ Mol. Wt. Connected Branch Copolymer | Mol. Wt. Connected Branch Copolymer/ Mol. Wt. Linear Polymer |
|---|---|---|---|---|---|
| 600-8-88 | 4.1 | 4125 | 1.65 | 0.78 | 1.28 |
| 600-14-1000 | 15.1 | 4403 | 28.6 | 0.22 | 4.55 |
| 600-26-600 | 17.6 | 3682 | 48.9 | 0.17 | 5.88 |
| 1000-8-1000 | 10.4 | 4057 | 13.1 | 0.30 | 3.33 |
| 1000-14-600 | 10.6 | 3692 | 14.9 | 0.29 | 3.45 |
| 1000-26-88 | 13.8 | 16103 | 6.3 | 0.44 | 2.27 |
| 5000-8-600 | 10.4 | 7643 | 6.9 | 0.41 | 2.44 |
| 5000-14-88 | 8.4 | 53715 | 0.61 | 1.18 | 0.85 |
| 5000-26-1000 | 27.3 | 18826 | 28.2 | 0.24 | 4.17 |

Table V shows, for example, that the 1000-8-1000 connected branch copolymer, which has a molecular weight of 10400 and a neat viscosity of 4057 sus. at 37.8° C. has a viscosity 13.1 times less than a linear polymer of the same molecular weight and the same viscosity as a linear polymer having only 0.30 times the molecular weight. It will be seen from the data in Table V that the connected branch copolymers typically have 3 or more times the molecular weight of the linear polymer having the same neat viscosity.

Figure 2:
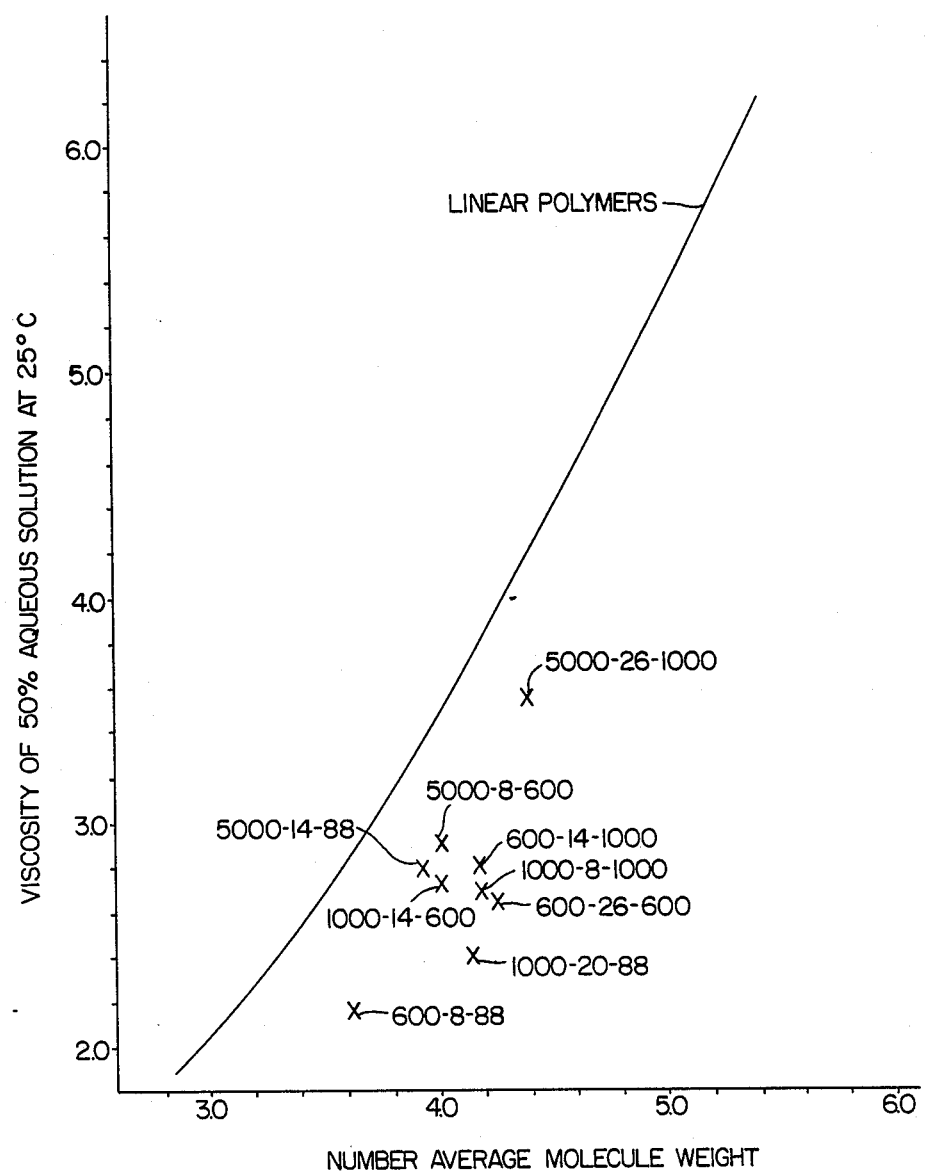
FIG. 2 is a graph of the viscosity of 50 percent aqueous solutions against number average molecular weight for the same connected branch copolymers as in FIG. 1, as described in Example 4 below.

FIG. 2 of the accompanying drawings is a graph plotting the 50 percent aqueous solution viscosities shown in Table IV against the number average molecular weight of the connected branch copolymers. FIG. 2 also includes the corresponding curve showing that the dependence of the viscosity of 50 percent aqueous solutions against the average molecular weight for the prior art linear polyoxyalkylene polymers. It will be seen from FIG. 2 that the viscosities of the aqueous solutions of the connected branch copolymers are very substantially lower than the viscosities of similar solutions of linear polymers having the same number average molecular weight. However, the apparent similarity between FIGS. 1 and 2 is highly misleading, largely owing to the logarithmic axes used. Table VI shows the neat viscosities and the viscosities of 50 percent aqueous solutions of the connected branch copolymers at 25° C. (taken from Table IV above) and the ratio of the neat viscosity to the viscosity of the 50 percent aqueous solution. The same values are shown for the UCON Fluid 75-H-90000 linear polymer. (The neat viscosities of the UCON Fluids 75-H-450 and 75-H-14000 are too low and too far removed from the those of the connected branch copolymers to provide a useful basis for comparison, while the viscosity of the 50 percent aqueous solution of the UCON Fluid 75-H-380000 linear polymer was not measured.)

TABLE VI

| | Viscosity (sus.) at 25° C. | | |
|---|---|---|---|
| Polymer | Neat | 50% Aqueous Soln. | Ratio Neat Viscosity/Viscosity 50% Aqueous Soln. |
| 600-8-88 | 8421 | 147 | 57.3 |
| 600-14-1000 | 7899 | 627 | 12.6 |
| 600-26-600 | 7566 | 462 | 16.4 |
| 1000-8-1000 | 7758 | 497 | 15.6 |
| 1000-14-600 | 7365 | 546 | 13.5 |
| 1000-26-88 | 45015 | 251 | 179.3 |
| 5000-8-600 | 15988 | 815 | 19.6 |
| 5000-14-88 | 99217 | 645 | 153.8 |
| 5000-26-1000 | 35537 | 2400 | 14.8 |
| 75-H-90000 (Control) | 176000 | 3700 | 47.6 |

From the data in Table VI, it will be seen that, except for the three connected branch copolymers (600-8-88, 1000-26-88 and 5000-14-88) having very short linear polymer segments (which results are presumably rendered anomalous by the very strong hydrogen bonding in these short linear polymer segment connected branch copolymers), the ratios of neat viscosity to viscosity of 50 percent aqueous solution are much lower for the connected branch copolymers than for the prior art linear polymer. That is to say, upon dilution the connected branch copolymers retain a much greater proportion of their neat viscosity than does the prior art linear polymer. For example, whereas the viscosity of the linear 75-H-9000 linear polymer drops by a factor of 47 when the neat polymer is diluted to a 50 percent aqueous solution, the viscosity of the 5000-26-1000 connected branch copolymer drops by a factor of only 14.8. Thus, the connected branch copolymers used in the methods and compositions of the present invention have much better dilution viscosity characteristics than similar prior art linear polymers.

Figure 3:
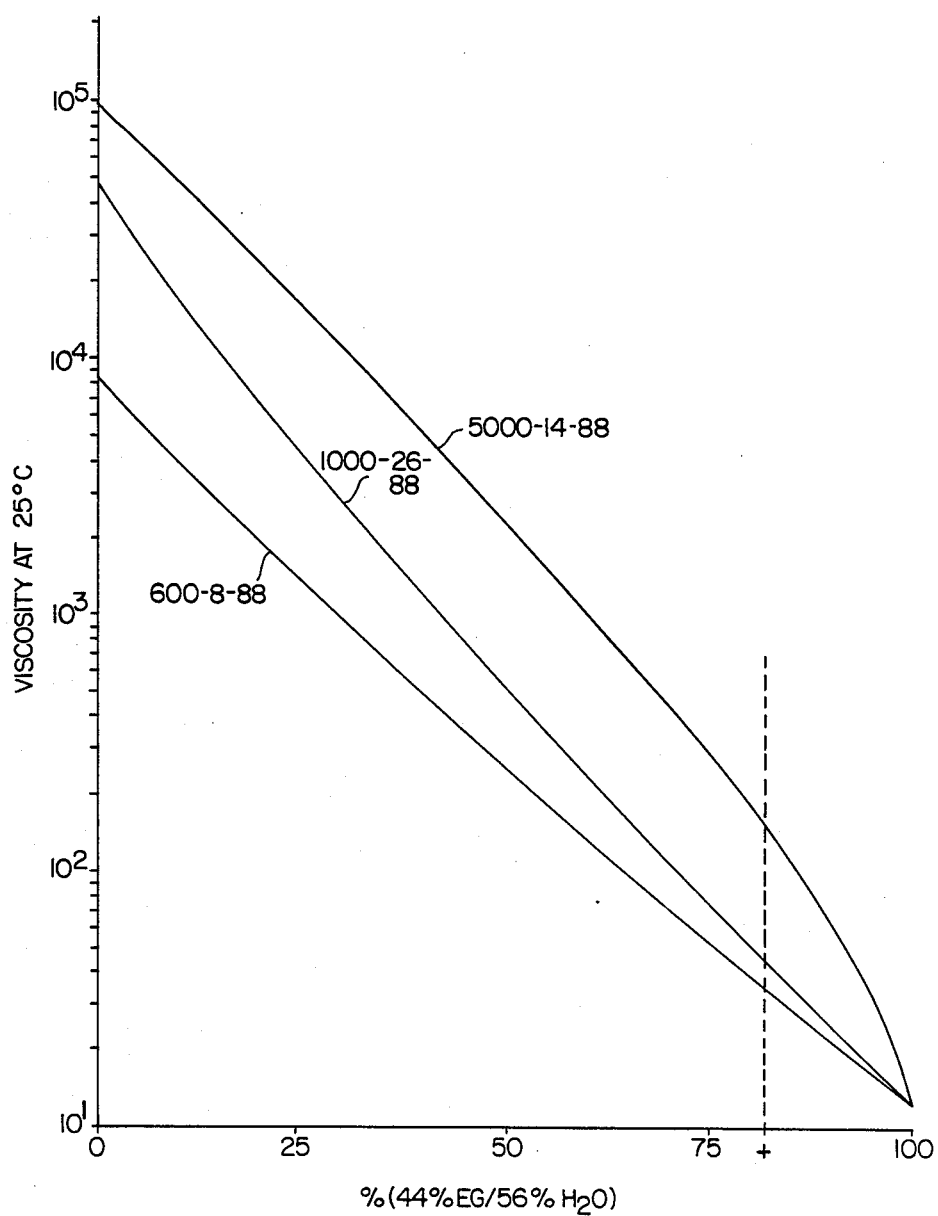
FIGS. 3, 4 and 5 are graphs showing the variation of viscosity with concentration of connected branch copolymers in aqueous lubricant compositions containing ethylene glycol as a co-solvent.
Figure 4:
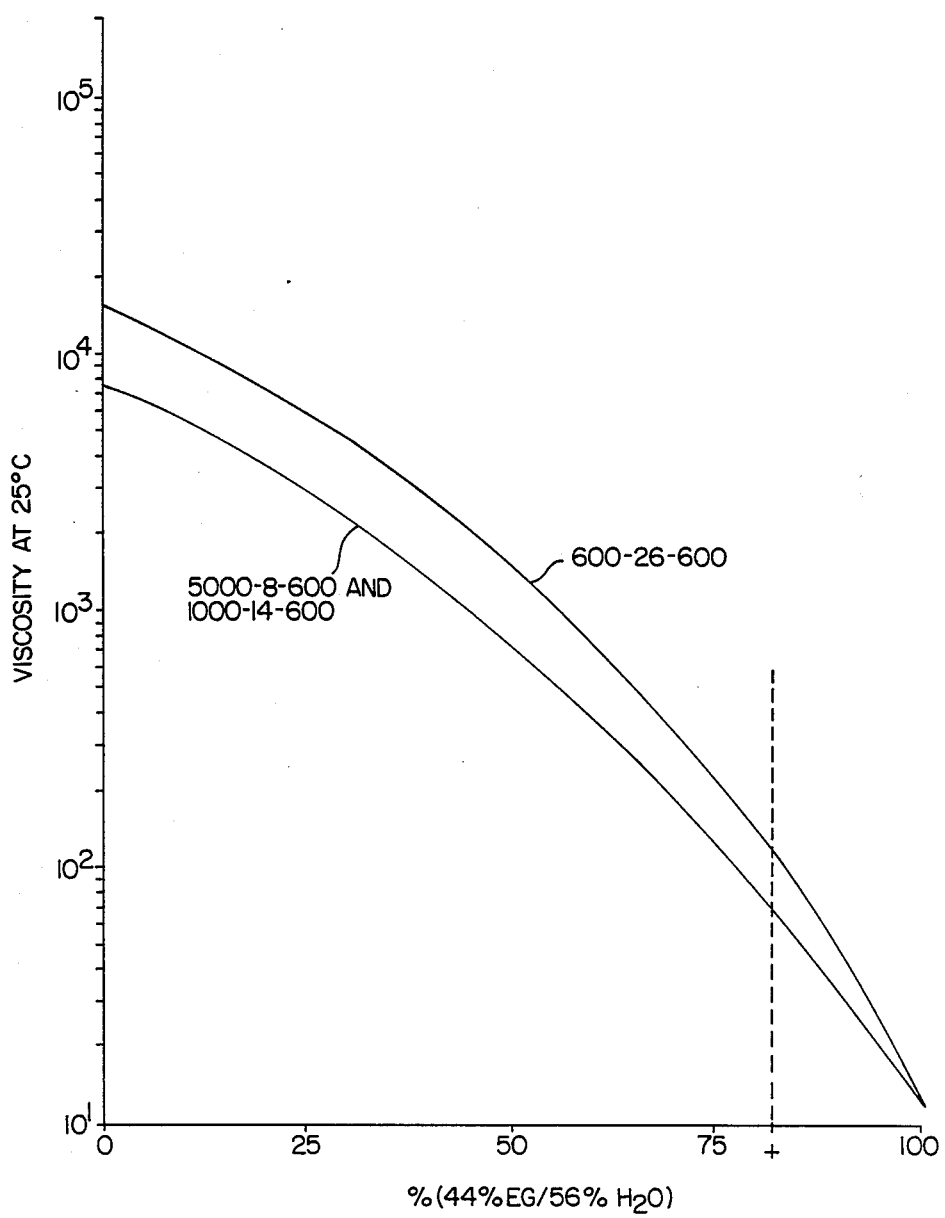
Figure 5:
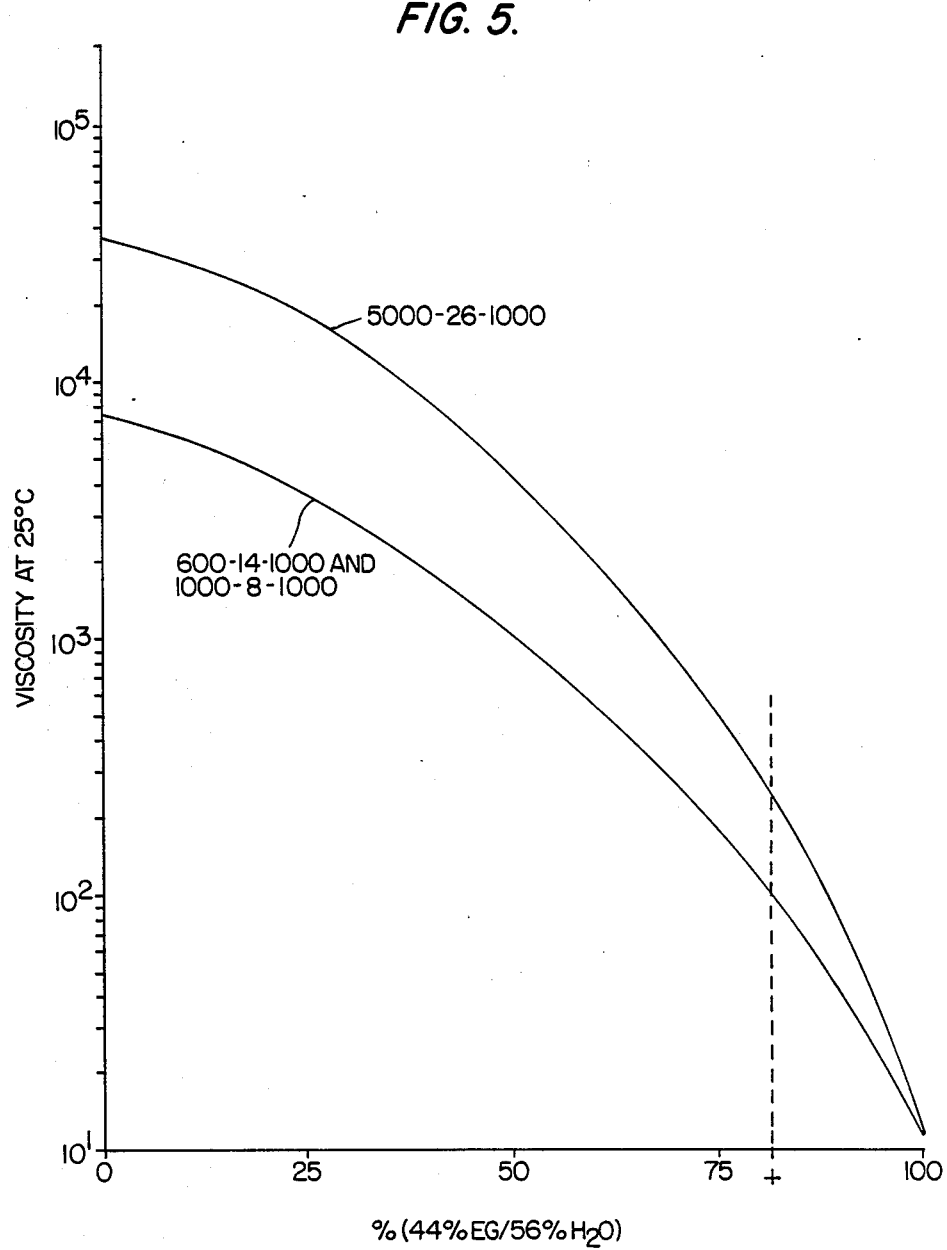

In order to further examine the dilution viscosity characteristics of the experimental connected branch copolymers, the viscosities of lubricant compositions comprising the connected branch copolymers dissolved in a mixture of 44 percent by weight of ethylene glycol and 56 percent by weight of water were determined in the same manner as before but using compositions comprising varying amounts of the connected branch copolymers. The resulting dilution viscosity curves are shown in FIGS. 3, 4 and 5; FIG. 3 shows the curves for the connected branch copolymers having linear polymer segments with an average molecular weight of 88, FIG. 4 those for the connected branch copolymers in which the linear polymer segments have an average molecular weight of 600 and FIG. 5 those for the connected branch copolymers in which the linear polymer segments have an average molecular weight of 1000.

The three curves shown in FIG. 3, those for the 600-8-88, 1000-26-88 and 5000-14-88 connected branch copolymers, are essentially straight lines (on the logarithmic viscosity scale used) and show a relatively rapid drop-of in viscosity with increase in dilution. On the other hand, the curves for the 5000-8-600, 1000-14-600 and 600-26-600 connected branch copolymers shown in FIG. 4 reveal that these connected branch copolymers, with large linear polymer segments, are less affected by dilution. Indeed, the dilution viscosity curves for these connected branch copolymers shown in FIG. 4 more closely resemble the dilution viscosity terms of the commercially-available 75-H linear polymers used as controls in the experiments discussed above. Also, the less rapid drop-off of viscosity of the connected branch copolymers having linear polymer segments with an average molecular weight of 600 is consistent with the relatively smaller loss of viscosity of these connected branch copolymers upon dilution to 50 percent simple aqueous solution, as already discussed above. The general shape of the dilution viscosity curves for the 600-14-1000, 1000-8-1000 and 5000-26-1000 connected branch copolymers shown in FIG. 5 is similar to those shown in FIG. 4, but those in FIG. 5 show even less viscosity drop-of with dilution.

It should be noted that, although the connected branch copolymers used in these experiments were chosen to provide good indications of the variation of the physical properties of the connected branch copolymers with molecular architecture, and no attempt was made to optimize the molecular architecture of the connected branch copolymers for use in lubricant compositions, FIGS. 3, 4 and 5 show that, when used in a typical formulation of 20 percent polymer, 35 percent ethylene glycol and 45 percent water (denoted by the broken vertical lines in FIGS. 3, 4 and 5), the 5000-14-88, 5000-8-600 and 5000-26-1000 polymers all gave compositions having viscosities comparable to, or greater than, the commercial 75-H-90000 linear polymer used as a control in the experiments discussed above.

Figure 6:
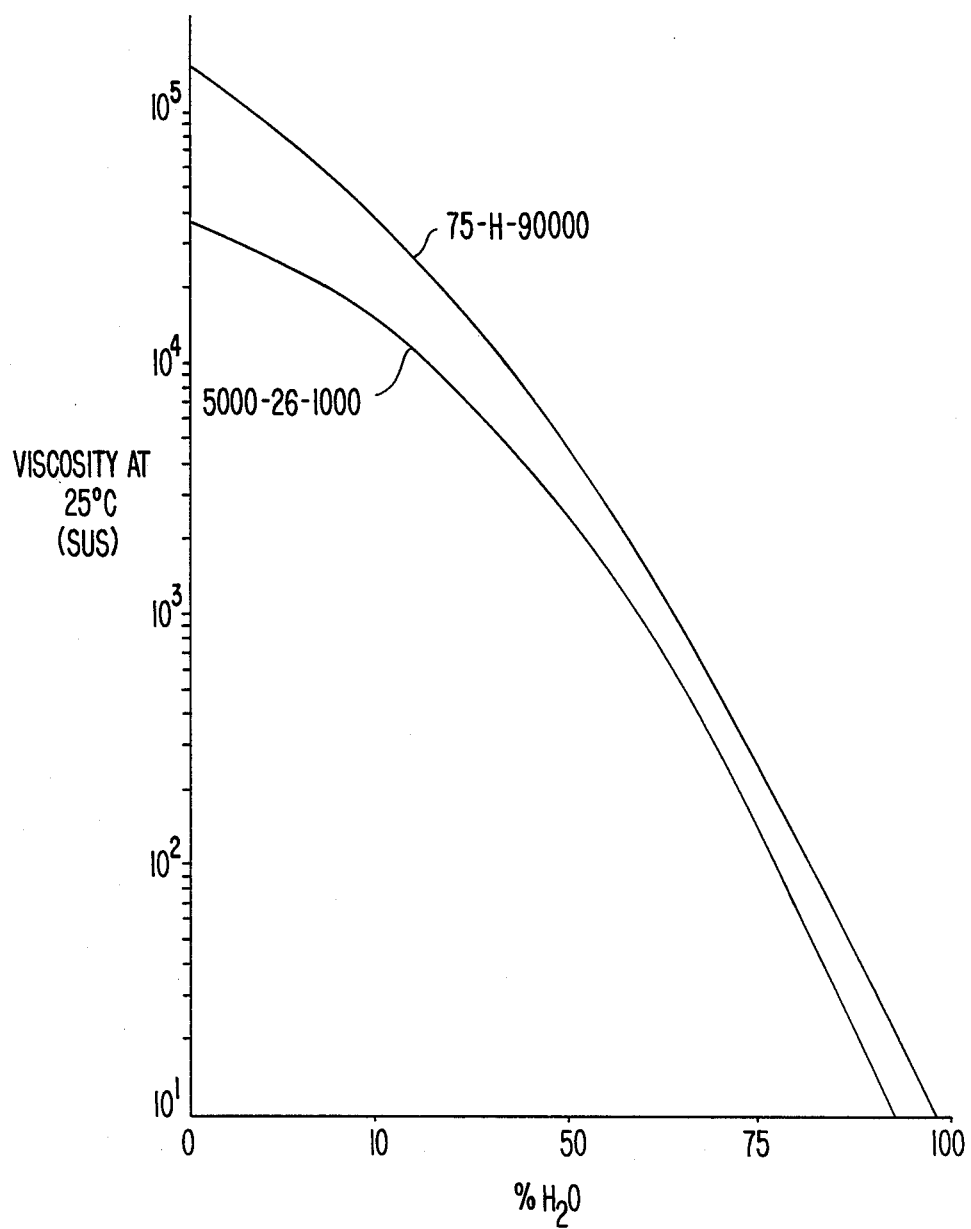
FIG. 6 is a graph showing the variation of viscosity with concentration of a connected branch copolymer and a prior art linear polymer in simple aqueous solution.

In order to determine whether the improved dilution viscosity characteristics of the connected branch copolymers shown in FIGS. 3, 4 and 5 in water/ethylene glycol solutions were also achieved in simple aqueous solution, similar dilution viscosity tests were carried out in simple aqueous solution with the 5000-26-1000 connected branch copolymer and with the UCON Fluid 75-H-90000 control polymer. The results are shown in FIG. 6. As may be seen from this Figure, the dilution viscosity characteristics of the 5000-26-1000 connected branch copolymer in simple aqueous solution are much better than those of the commercial UCON Fluid 75-H-90000 linear polymer. The neat viscosity of the 75-H-90000 linear polymer is approximately five times that of the 5000-26-1000 connected branch copolymer. However, in a 90 percent by weight of water/10 percent by weight polymer solution, the viscosity of 75-H-90000 is approximately twice that of the 5000-26-1000 polymer. In fact, the viscosity of 75-H-90000 drops several orders of magnitude, from 176000 to 27.6 sus. on dilution from the neat polymer to the 10 percent aqueous solution, while similar dilution of the 5000-26-1000 connected branch copolymer causes a drop in viscosity only from 35537 to 13.5 sus.

The values for neat viscosity at 37.8° C. of the connected branch copolymers given in Table IV above were subjected to multiple regression analysis to determine the dependence of the viscosity upon the three main structural parameters, namely molecular weight of the core segment, number of branches and molecular weight of the linear polymer segments. The relationship was found to be:

$$\log \eta = 3.40 + 1.40 \times 10^{-4}x_1 + 1.79 \times 10^{-1}x_2 - 9.60 \times 10^{-3}x_2^2 - 2.00 \times 10^{-3}x_3 + 1.56 \times 10^{-6}x_3^2 \quad (I)$$

where: $x_1$ is the molecular weight of the core segment, $x_2$ is the number of branches and $x_3$ is the molecular weight of each linear polymer segment. The correlation coefficient was 0.96.

According to Equation I above, the neat viscosity of the connected branch copolymers is more dependent upon the number of branches and the average molecular weight of the linear polymer segments than on the molecular weight of the core segment. This empirical finding is in accordance with theoretical expectations concerning the viscosity of polyoxyalkylene polymers. According to conventional viscosity theory, the viscosity of such polymers is a result of two separate forces, namely chain entanglement and hydrogen bonding. In prior art linear polyoxyalkylene polymers, as the molecular weight increases the linear chains are able to inter-, as well as intra-coil, thereby causing a very rapid increase in viscosity with molecular weight. In contrast, in the connected branch copolymers, because the major portion of the molecular weight is divided among a large number of linear polymer segments, the length of each individual linear polymer segment remains relatively short until the molecular weight of the entire connected branch copolymer becomes much greater than in typical prior art linear polymers. Because of the relatively short chains present in the linear polymer segments, chain entanglement cannot occur until much higher molecular weights, so that the connected branch copolymers can have higher molecular weights than prior art linear polymers while still retaining lower viscosities. Furthermore, since the number of branches in the connected branch copolymers can readily be controlled by varying the number of moles of branching polymerization monomer provided for each mole of core reactant, the molecular weight of a connected branch copolymer can be increased while keeping its viscosity constant, simply by increasing the number of branches, since the crucial factor affecting viscosity is the length of each individual linear polymer segment rather than total molecular weight of the entire polymer. When the linear polymer segments are very short (e.g. in the 600-8-88, 1000-26-88 and 5000-14-88 connected branch copolymers shown in Table IV above), the most important factor affecting the neat viscosity is hydrogen bonding between the terminal hydroxyl groups on the linear polymer segments. Such hydrogen bonding causes the neat viscosities to be much higher than would otherwise be expected. As the length of the individual linear polymer segments is increased, the influence of hydrogen bonding rapidly decreases, causing a minimum viscosity at a particular linear polymer segment length, where the influence of hydrogen bonding is too small to significantly raise the viscosity, but the linear polymer segments are still too short for significant chain entanglement to be a factor in increasing viscosity.

Figure 7:
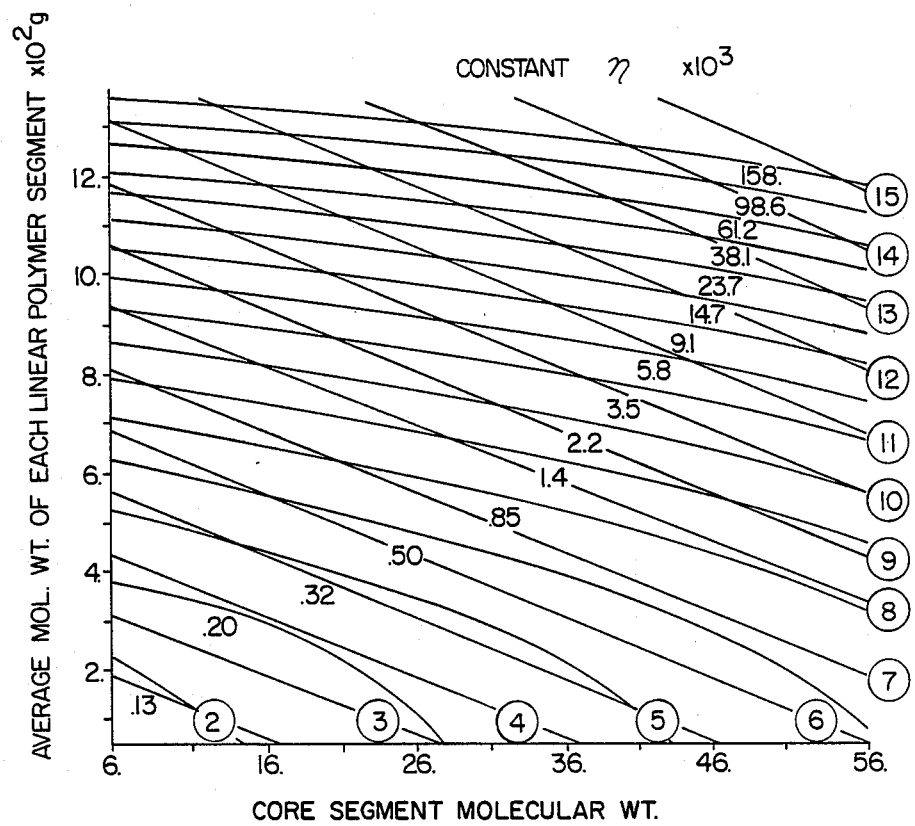
FIG. 7 is a graph showing the variation of neat viscosity of connected branch copolymers used in the methods and compositions of the present invention with the sizes of the core and linear polymer segments, for a given number of terminal linear polymer segments wherein the circled numbers are the average molecular weight (x $10^2$ g/mol ) of the total molecular weight copolymer.

Equation I above was used to generate curves showing the variation of neat viscosity with the average molecular weight of each linear polymer segment and with the molecular weight of the core segment. The resultant curves for a connected branch copolymer having 8 total branches are shown in FIG. 7. Also shown in FIG. 7 are diagonal lines joining the connected branch copolymers of the same total molecular weight. For ease of reference, the figures denoting constant molecular weight (in thousands) are circled in FIG. 7. FIG. 7 and similar plots for connected branch copolymers having other numbers of total branches are useful in designing the molecular architecture of a connected branch copolymer for a particular application, since they indicate how a connected branch copolymer having any particular combination of neat viscosity and total molecular weight can be produced.

EXAMPLE 5

As a result of the experiments described in Example 4 above, it was determined that further useful information concerning the relationship between the dilution viscosity characteristics of the connected branch copolymers and the molecular architecture of such polymers could be obtained by synthesizing a series of connected branch copolymers having differing sizes of core segment, differing number of branches and differing sizes of linear polymer segments, but with the size of the linear polymer segments chosen so that the neat viscosity of each of the connected branch copolymers at 37.8° C. would be approximately 90000 sus. This neat viscosity was chosen to enable the dilution viscosity characteristics of the connected branch copolymers to be compared directly with the aforementioned prior art polymer UCON Fluid 75-H-90000, which has the same neat viscosity of 90000 sus. at 37.8° C. Accordingly, a series of nine connected branch copolymers having core segment molecular weights of 600, 1000 and 5000, and 8, and 26 total branches were synthesized according to this plan, these connected branch copolymers being as follows (in the abbreviated nomenclature used in Example 4 above):

600-8-4487
600-14-4069
600-26-5877
1000-8-6661
1000-14-4965
1000-26-7908
5000-8-4290
5000-14-4726
5000-26-4886.

To investigate the effects of even greater extension of the core segment at the same neat viscosity, a 9048-26-7165 polymer was also synthesized. All these experimental polymers were synthesized in the same manner as in Example 1 and 2 above, using the same ethylene oxide/propylene oxide monomer mixture for the core and linear polymer segments, and glycidol as the branching polymerization monomer.

For each of these ten connected branch copolymers, and for the prior art UCON Fluid 75-H-90000 linear polymer, various properties were determined as shown in Table VII below.

The proportion of glycidol in the connected branch copolymers was calculated because glycidol is much more expensive than the other monomers used to prepare the connected branch copolymers, so that a connected branch copolymer containing a large proportion of glycidol would be too expensive too compete with prior art linear polymers which do not contain glycidol. The pour points of the polymers were determined experimentally, since these pour points determined the lowest temperature at which the connected branch copolymer can be used in practice, assuming that the connected branch copolymer will be shipped neat and diluted on site to produce the ready-to-use lubricant composition. The surface tensions of the polymers were measured in 1 percent aqueous solution since too low a surface tension will result in excessive foaming of the lubricant composition under practical conditions of use. Finally, the kinematic viscosities were measured neat at 25° C. and 37.8° C., and in 50 percent aqueous solutions at 25° C.

$$10^{-7}x_1^2 + 3.20 x_2 - 1.05 \times 10^{-1}x_2^2 + 1.15 \times 10^{-2}x_3 - 7.8 \times 10^{-7}x_3^2 \quad \text{(II)}$$

with a coefficient of correlation of 0.98. ($x_1$, $x_2$ and $x_3$ in Equation II are the same as in Equation I above.) Equation II indicates that the pour point is dependent upon all three structural variables but is primarily dependent upon the number of branches in the connected branch copolymer.

The surface tensions in 1 percent aqueous solutions at 25° C. shown in Table VII are all from 5 to 11 percent higher than that of the prior art UCON Fluid 75-H-90000 linear polymer. Thus, the connected branch copolymers should produce less stable foams than the prior art linear polymer.

From the viscosity data in the last three columns of Table VII, it will be seen that, in accordance with the design of the experiment, the neat viscosities of all the connected branch copolymers at 37.8° C. closely approximated that of the 75-H-90000 linear polymer, and although there is a somewhat greater variation, the neat viscosities of the connected branch copolymers at 25° C. were also reasonably similar to that of the linear polymer. However, all the connected branch copolymers had viscosities in 50 percent aqueous solution which were higher than that of the linear polymer, and in some cases very significantly higher. For example, although the 5000-14-4726 connected branch copolymer had a neat viscosity at 37.8° C. which was slightly

TABLE VII

| Polymer | Molecular Wt. × 10³ | % Glycidol (by weight) | Pour Point °C. | Surface Tension 1% aq; dynes/cm soln. 25° C. | Viscosity sus neat 25° C. | neat 37.8° C. | 50% aq. soln. 25° C. |
|---|---|---|---|---|---|---|---|
| 600-8-4487 | 36.9 | 1.2 | −5 | 57.0 | 231,799 | 108,643 | 5,444 |
| 600-14-4069 | 63.9 | 1.4 | 0 | 55.0 | 196,962 | 96,973 | 4,327 |
| 600-26-5877 | 155. | 1.1 | −5 | 54.0 | 167,659 | 89,746 | 4,317 |
| 1000-8-6661 | 54.7 | 0.8 | 2 | 56.0 | 167,659 | 89,507 | 3,911 |
| 1000-14-4965 | 71.4 | 1.2 | 2 | 55.5 | 170,818 | 90,836 | 4,547 |
| 1000-26-7908 | 208. | 0.9 | −5 | 57.2 | 154,294 | 89,250 | 5,300 |
| 5000-8-4290 | 39.8 | 1.1 | −5 | 55.5 | 179,513 | 95,807 | 3,985 |
| 5000-14-4726 | 72.1 | 1.2 | 2 | 56.5 | 163,669 | 94,655 | 6,927 |
| 5000-26-4886 | 134. | 1.3 | −10 | 54.7 | 160,511 | 93,908 | 6,491 |
| 9048-26-7165 | 197. | 0.9 | 0 | 56.0 | 171,707 | 90,171 | 4,246 |
| 75-H-9000 (Control) | 10.3 | — | 0 | 51.5 | 176,000 | 96,382 | 3,700 |

It will be seen from Table VII that all of the connected branch copolymers contain approximately 1 percent glycidol by weight. At this level, the glycidol constitutes only a few cents per pound to the cost of the connected branch copolymers, thereby making the connected branch copolymers not unduly expensive for incorporation into economically-practicable lubricant compositions having regard to the other advantages of the connected branch copolymer discussed below.

Also from Table VII, it will be seen that all the connected branch copolymers had pour points of not more than 2° C., so that the pour points are low enough to enable these connected branch copolymers to be used under practical conditions. Multiple regression analysis of the variation of the pour point with the molecular weights of the core segment and linear polymer segments, and the number of branches gave the following relationship:

$$\text{pour point (°C.)} = -58.3 - 9.7 \times 10^{-4}x_1 + 1.53 \times \quad \text{(II)}$$

less than that of 75-H-90000, its viscosity in 50 percent aqueous solution was 1.87 times that of 75-H-90000. Similarly, the 5000-26-4886 connected branch copolymer had a neat viscosity at 37.8° C. slightly less than that of 75-H-90000, but a viscosity in 50 percent aqueous solution which was 1.75 times that of the 75-H-90000 linear polymer.

The improved dilution characteristics achieved with most of the connected branch copolymers as shown by the viscosity data in Table VII may be more readily appreciated from the first three columns of Table VIII alone. The first two columns of Table VIII show the viscosities of the neat and 50 percent aqueous solutions of the connected branch copolymers at 25° C. as a proportion of the viscosity of the linear 75-H-90000 polymer under the same conditions. The third column of Table VIII shows the ratio of the neat viscosity to the 50 percent aqueous solution viscosity of the connected branch copolymers at 25° C.; it will be recalled from Table VI above that the corresponding ratio for the 75-H-90000 polymer is 47.6. Also shown in Table VIII are the corresponding ratios of viscosity of the connected branch copolymer to viscosity of 75-H-90000 in 10 percent and 20 percent aqueous solutions, and in a solution comprising 20 percent by weight of the polymer and 80 percent by weight of the 44 percent ethylene glycol/56 percent water mixture used in the previous experiments described above with reference to FIGS. 3, 4 and 5.

TABLE VIII

| Polymer | Neat | 50% Aq. | Neat/50% Aq. | 10% Aq. | 20% Aq. | 20% in EG—H$_2$O |
|---|---|---|---|---|---|---|
| 600-8-4487 | 1.3 | 1.47 | 45 | 1.12 | 1.21 | 0.62 |
| 600-14-4069 | 1.1 | 1.17 | 46 | 1.12 | 1.21 | 1.10 |
| 600-26-5877 | 0.95 | 1.17 | 39 | 1.15 | 1.45 | 1.26 |
| 1000-8-6661 | 0.95 | 1.06 | 43 | 1.04 | 1.09 | 0.93 |
| 1000-14-4965 | 0.97 | 1.23 | 38 | 1.08 | 1.21 | 1.07 |
| 1000-26-7908 | 0.88 | 1.43 | 29 | 1.04 | 1.12 | 1.23 |
| 5000-8-4290 | 1.02 | 1.08 | 45 | 1.04 | 1.12 | 1.41 |
| 5000-14-4726 | 0.93 | 1.87 | 24 | 1.15 | 1.38 | 1.10 |
| 5000-26-4886 | 0.91 | 1.75 | 25 | 1.15 | 1.41 | 1.12 |
| 9048-26-7165 | .98 | 1.15 | 40 | 1.19 | 1.29 | 1.15 |

From the data in Table VIII, it will be seen that in all cases the ratio between the viscosities of the connected branch copolymer and the viscosity of the prior art 75-H-90000 linear polymer increases when the neat polymer is diluted to a 50 percent aqueous solution i.e. as reflected in the third column of Table VIII, the viscosities of the connected branch copolymers fall less than that of the linear polymer upon dilution from the neat polymer to a 50 percent aqueous solution. Similarly, the ratios between the viscosities of the connected branch copolymers and the viscosity of the 75-H-90000 linear polymer increase upon dilution from the neat polymer to 10 percent and 20 percent aqueous solutions, and, except for the 600-8-4487 connected branch copolymer, the same is true when the neat connected branch copolymer is diluted with the ethylene glycol/water mixture. Thus, the experimental polymers all have better dilution viscosity characteristics than the prior art 75-H-90000 linear polymer. It will also be seen from Table VIII that in most cases the improvement in viscosity relative to that of the linear polymer increases with increase in the number of branches in the connected branch copolymer.

Thus, by the choice of the appropriate combination of structural variables in the connected branch copolymers used in the methods and compositions of this invention, a lubricant composition can be prepared having better viscosity dilution characteristics, thereby enabling a desired viscosity to be achieved using less polymer, and thus at lower cost, than with the prior art linear polymers.

Figure 8:
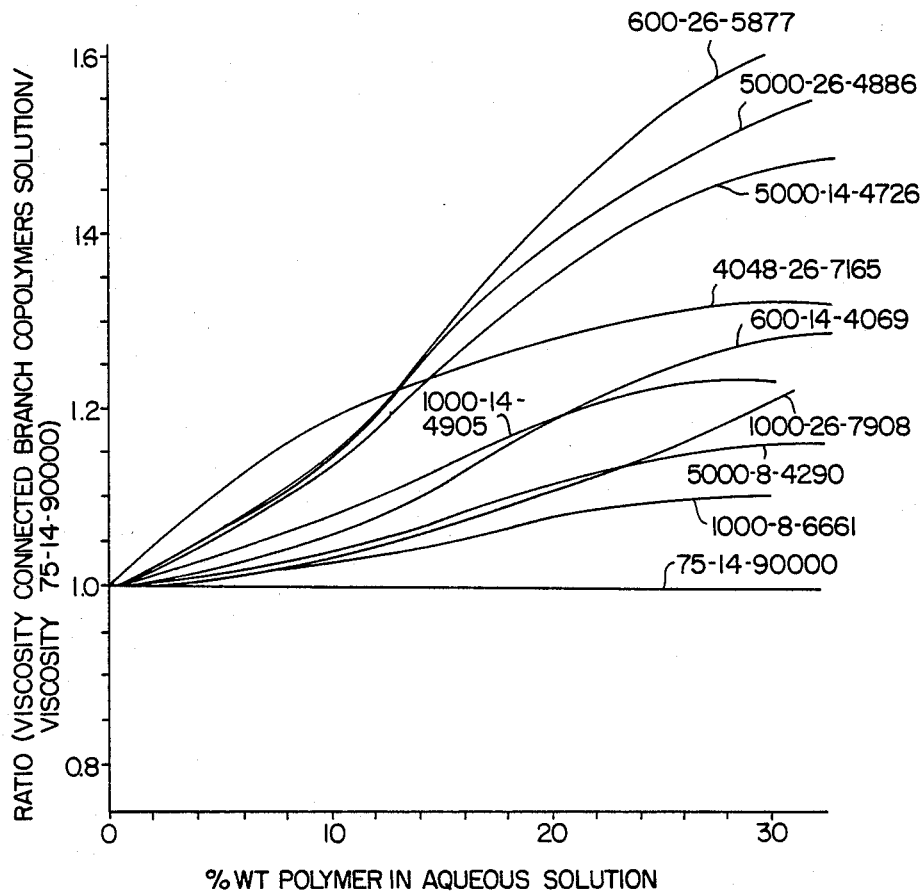
FIG. 8 is a graph showing the ratios between the viscosities of aqueous solutions of the connected branch copolymers and the viscosity of a similar solution of a prior art linear polymer as a function of the proportion of the connected branch copolymer in the solution.

In order to further investigate the viscosity ratios between aqueous solutions of the connected branch copolymers and the UCON Fluid 75-H-90000 linear polymer in the main field of practical interest i.e. aqueous solutions containing not more than about 30 percent of polymer, the viscosities of various solutions of the connected branch copolymer containing not more than about 30 percent of the polymer were determined using a variety of connected branch copolymer concentrations, and the resultant viscosity ratios calculated and plotted in FIG. 8. The more extensive data reflected in FIG. 8 confirm the conclusions reached above from the data in Table VIII, namely that the aqueous solutions of the connected branch copolymers have, within this field of practical interest, viscosities which are greater, and in some cases very substantially greater, than corresponding solutions of the prior art 75-H-90000 linear polymer.

Figure 9:
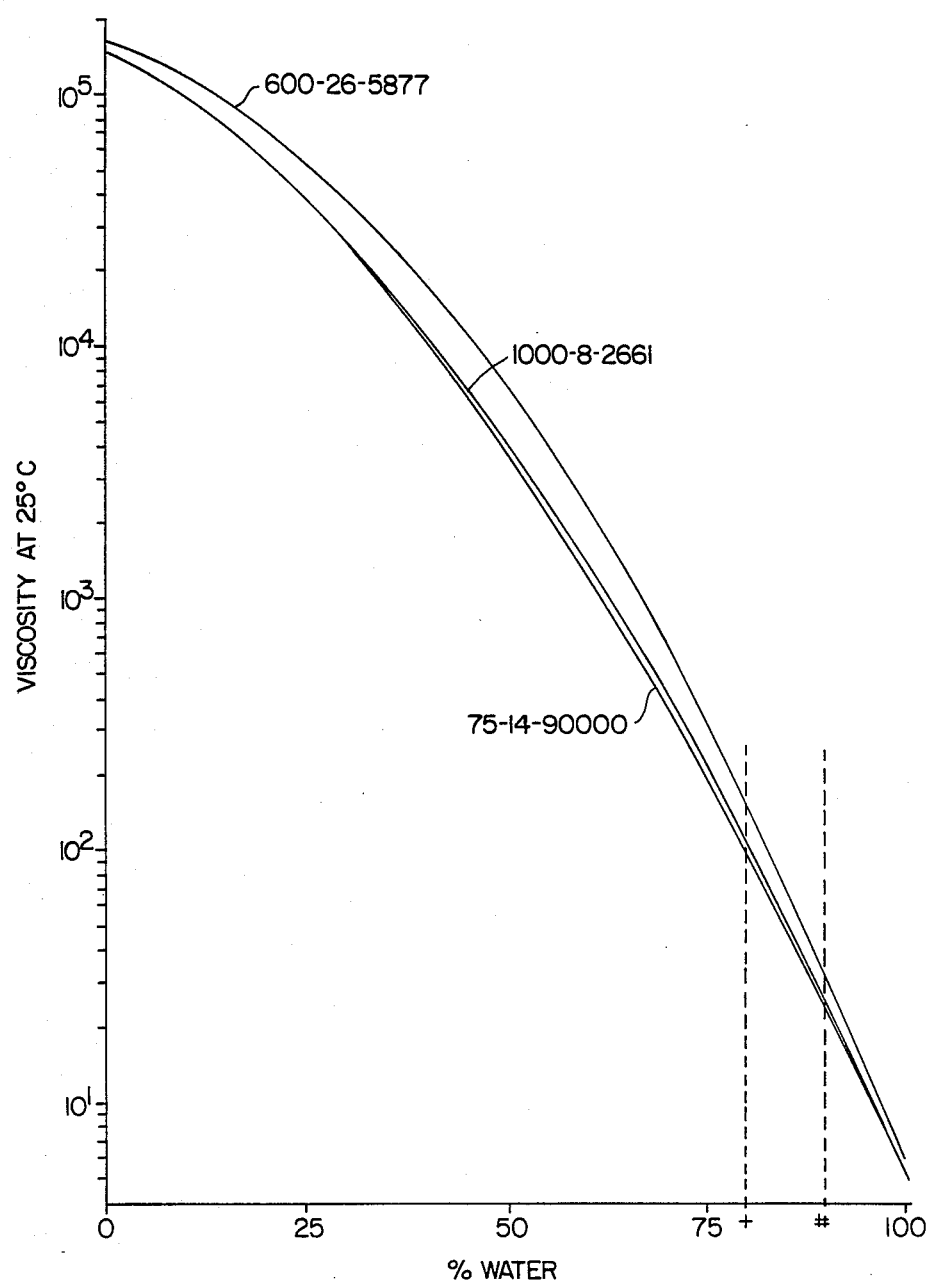
FIG. 9 is a graph showing the viscosities of aqueous solutions of two connected branch copolymers and the prior art linear polymer as a function of the concentration of the polymer in the solutions.
Figure 10:
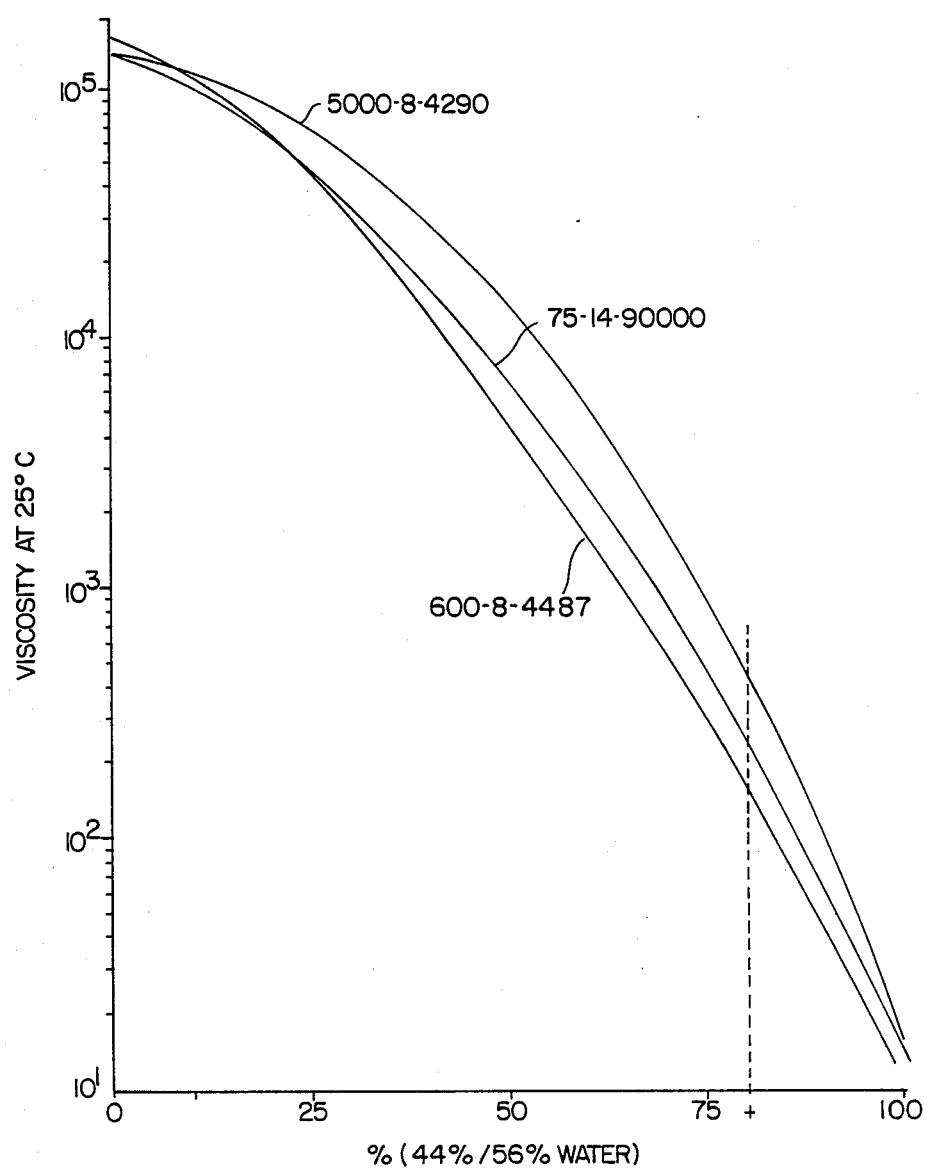
FIG. 10 is a graph similar to that of FIG. 9 but using two different connected branch copolymers and using as the solvent a 44 weight percent ethylene glycol/56 weight percent water mixture.

Experiments were also conducted to determine the viscosity of the connected branch copolymers in aqueous solution, and in solution in the 44 percent by weight ethylene glycol/56 percent by weight water mixture used in earlier experiments described above, over the full range of 100-0 percent by weight polymer i.e. from the neat connected branch copolymer to infinite dilution. The results obtained with water alone are shown in FIG. 9, while those obtained with the ethylene glycol/water mixture are shown in FIG. 10. In each case, for the sake of simplicity, only the two extreme types of curve generated by the connected branch copolymers are shown, together with the curve for the 75-H-90000 linear polymer, these two extreme cases being the 600-26-5877 and 1000-8-2661 connected branch copolymers in the case of the aqueous solutions, and the 5000-8-4290 and 600-8-4487 connected branch copolymers in the case of the ethylene glycol/water solutions. The two broken vertical lines in FIG. 9 indicate the 10 percent and 20 percent by weight connected branch copolymer solutions for which viscosity data are given in Table VIII above, while the single broken vertical line in FIG. 10 simply designates the 20 percent by weight polymer solution for which viscosity data are given in Table VIII above.

It will be seen from FIG. 9 that the 600-26-5877 connected branch copolymer maintains a higher viscosity, and a higher percentage of its neat viscosity, throughout the dilution range than does the 75-H-90000 linear polymer. Specifically, in a solution containing by weight of the polymer, the 600-26-5877 connected branch copolymer has approximately 1.4 times the viscosity of the linear polymer at the same concentration. In contrast, the 1000-8-2261 connected branch copolymer has approximately the same viscosity as the 75-H-90000 linear polymer throughout the dilution range. The remaining eight connected branch copolymers produced viscosity versus dilution curves falling between the 1000-8-2661 and 600-26-5877 polymers shown in FIG. 9.

FIG. 10 shows that the 5000-8-4290 connected branch copolymer maintains a higher percentage of its neat viscosity than does the 75-H-90000 linear polymer. Specifically, at 20 percent polymer, the 5000-8-4290 has a viscosity 1.41 times that of the linear polymer. In contrast, the 600-8-4487 connected branch copolymer, although having a higher neat viscosity than the linear polymer, loses a greater proportion of its viscosity upon dilution so that its viscosity in the 20 percent polymer solution is only 0.6 times that of the linear polymer.

The data for the neat viscosities of the connected branch copolymers at 37.8° C. (designated $\eta_{37.8}$), and for the viscosities in 20 percent by weight aqueous solution at 25° C. (designated $\eta_{25}$ (20 percent aq.)), given in Table VII were subjected to multiple regression analysis to determine their dependence upon the length of the core segment, the total number of branches and the length of each linear polymer segment. The results obtained were as follows:

$$\log \eta_{37.8} = 5.17 + 1.14 \times 10^{-6} x_1 - 6.34 \times 10^{-5} x_3 + 5.0 \times 10^{-9} x_3^2 \quad \text{(III)}$$

and $$\log_{25} (20 \text{ percent aq.}) = 1.61 + 4.77 \times 10^{-3} x_2 - 1.71 \times 10^{-4} x_3 + 1.60 \times 10^{-8} x_3^2 \, 10^{-4} x_3 + 1.60 \times 10^{-8} x_3^2 \quad \text{(IV)}$$

where $x_1$, $x_2$ and $x_3$ are the same as in Equations 1 and 2 above.

The coefficients of correlation for Equations (III) and (IV) were 0.94 and 0.96 respectively.

From Equation (III) it will be seen that neat viscosity at 37.8° C. is more dependent on the length of the linear polymer segments than on the other two structural parameters. There is some dependence on the length of the core segment, but no dependence upon the number of branches. On the other hand, from Equation (IV), it will be seen that the viscosity of the 20 percent aqueous solutions at 25° C. again shows a strong dependence on the length of the linear polymer segments, and some dependence upon the number of branches, but no dependence upon the length of the core segment.

The relationships between viscosities and the structural parameters given by Equations (III) and (IV) above can be explained by the fact that the type of the connected branch copolymers being investigated, which have a bivalent linear core segment and only a single group of branched polymer segments and single group of linear polymer segments, can be regarded as a "double star" polymer in which the branched polymer segments form the nuclei of the two stars, the linear polymer segments form the arms of the stars and the core segment connects the nuclei of the stars. So far as the viscosity of the neat polymer and solutions thereof are concerned, the number of arms in each of the stars is not as important as the length of the arms or their ability to entangle. In the experimental polymers, the branched polymer segments account for only about 1 percent of the total molecular weight of the polymer, while the core segment accounts for between 1 and 12 percent of the molecular weight, leaving the bulk of the molecular weight i.e. more than 80 percent, in the linear polymer segments. Since the bulk of the molecular weight is present in the linear polymer segments, the terms for the linear polymer segments dominate the viscosity equations.

Equations (III) and (IV) above are in accordance with conventional viscosity theory, and with the relationships established from the data in Example 4 above, that the observed viscosities are the result of two separate forces, namely chain entanglement and hydrogen bonding. In the case of the connected branch copolymers used in this Example, which have linear polymer segments substantially longer than those used in Example 4 above, Equation (III) shows that the linear polymer segments are sufficiently long to exceed the critical value at which chain entanglement becomes a significant factor. Accordingly, as shown by Equation (III) and (IV) the viscosities both of the neat polymer and of the 20 percent aqueous solution are dominated by the terms representing the effect of the length of the linear polymer segments.

As noted in the Background of the Invention section above, one of the crucial parameters affecting the suitability of a polymer for use in lubricant compositions is the viscosity/pressure coefficient. Accordingly, the viscosity/pressure coefficients of the connected branch copolymers were determined in the 20 percent polymer, 80 percent ethylene glycol/water solutions previously described at 25° C., 38° C. and 65° C. using the aforementioned Ruska Viscometer. The viscosity of a liquid measured by this viscometer is directly proportional to the time the ball takes to fall. Rearranging the Warburg-Sacks equation quoted above given $$\eta_p / \eta_o = 1 + \alpha_p$$

where $\eta_p$ and $\eta_o$ are the viscosities at pressures $p$ and $o$ respectively, and $\alpha$ is the viscosity/pressure coefficient. Thus linear regression of $(\eta_p/\eta_o) - 1$ against pressure gives $\alpha$. The results are shown in Table IX below.

TABLE IX

| Polymer | VISCOSITY PRESSURE COEFFICIENT Atm.$^{-1}$, × $10^{-4}$ | | |
|---|---|---|---|
| | 25° C. | 38° C. | 65° C. |
| 75-H-90M | 3.08 ± .33 | 3.24 ± .21 | 3.68 ± .31 |
| 600-8-7908 | 3.09 ± .25 | 3.09 ± .32 | 4.04 ± .17 |
| 600-14-4069 | 2.87 ± .35 | 3.09 ± .25 | 2.87 ± .31 |
| 600-26-5877 | 3.09 ± .24 | 3.01 ± .18 | 3.75 ± .18 |
| 1000-8-6661 | 3.01 ± .03 | 3.38 ± .33 | 3.53 ± .74 |
| 1000-14-4965 | 2.87 ± .12 | 3.68 ± .30 | 3.24 ± .47 |
| 1000-26-7908 | 3.01 ± .35 | 3.60 ± .37 | 3.16 ± .13 |
| 5000-8-4290 | 3.31 ± .17 | 2.87 ± .37 | 3.82 ± .03 |
| 5000-14-4726 | 3.31 ± .17 | 3.60 ± .37 | 4.45 ± .64 |
| 5000-26-4886 | 3.68 ± .30 | 3.53 ± .42 | 3.97 ± .45 |
| 9048-26-7165 | 3.37 ± .14 | 3.82 ± .25 | 3.82 ± .94 |

From the data in Table IX, it will be seen that all the connected branch copolymers have viscosity/pressure coefficients comparable to these of the prior art UCON Fluid 75-H-90000 linear polymer, some of the connected branch copolymer coefficients being lower and some higher than the prior art polymer. All three connected branch copolymers having the long (5000 molecular weight) core segment had viscosity/pressure coefficients greater than those of the linear polymer, as did the single connected branch copolymer having the 9048 molecular weight core segment. At 25° C., the 5000-8-4290 and 5000-14-4726 connected branch copolymers had viscosity/pressure coefficients 7 percent higher than the linear polymer, while the 5000-26-4886 connected branch copolymer had a viscosity/pressure coefficient 19 percent greater than that of the linear polymer. Given the difficulties in increasing viscosity/pressure coefficients experienced in the preliminary experiments described in the Background of the Invention section above, these increases in viscosity/pressure coefficients achieved using the connected branch copolymers are extremely significant.

The data in Table IX taken at 25° C. were subjected to multiple regression analysis against the usual three structural parameters and the following equation derived:

$$\text{viscosity/pressure coefficient} = 3.59 + 1.66 \times 10^{-4} x_1 - \quad \text{(V)}$$

$$1.3 \times 10^{-8} x_1^2 - 9.3 \times 10^{-2} x_2 + 3.05 \times$$

-continued
$$10^{-3}x_2^2 - 5.0 \times 10^{-9}x_3^2$$

with a coefficient of correlation of 0.94.

From Equation (V) it appears that the viscosity/pressure coefficient is more dependent on the number of branches and on the length of the core segment than on the length of the linear polymer segments. This result is contrary to what might be anticipated on the basis of theoretical considerations. As noted above, the experimental connected branch copolymers essentially comprise two star polymers connected together by the linear core segment. The amount of compression which can be withstood by such a "double star polymer" should be dependent upon the hydrodynamic volume occupied by the stars, which in turn should be dependent upon the number of branches and how close together the two stars are. Accordingly, it will be anticipated that the length of the individual linear polymer segments should have a greater impact upon the hydrodynamic volume, and thus upon the viscosity/pressure coefficient than Equation (V) would indicate. However, the coefficient expressing the dependence of the viscosity pressure coefficient on the length of the linear polymer segments in Equation (V) may not be very reliable; because the experimental set of connected branch copolymers was designed so that all the polymers would essentially have the same neat viscosity, there is relatively little variation in the length of the linear polymer segments across the set of polymers, which may result in substantial inaccuracy in the coefficient of $x_3$ in Equation (V).

In theory, the optimum values for the structural parameters needed to produce the most favorable combination of physical properties in the connected branch copolymer should be obtainable by partial differentiation of each of Equations (II)–(V) with respect to each of the three structural parameters. Such a calculation indicates that the optimum connected branch copolymer for use in the methods in lubricant compositions of the invention would have a core segment molecular weight of 3200–6400, 15 total branches and linear polymer segments each having an average molecular weight of 6352.

Figure 11:
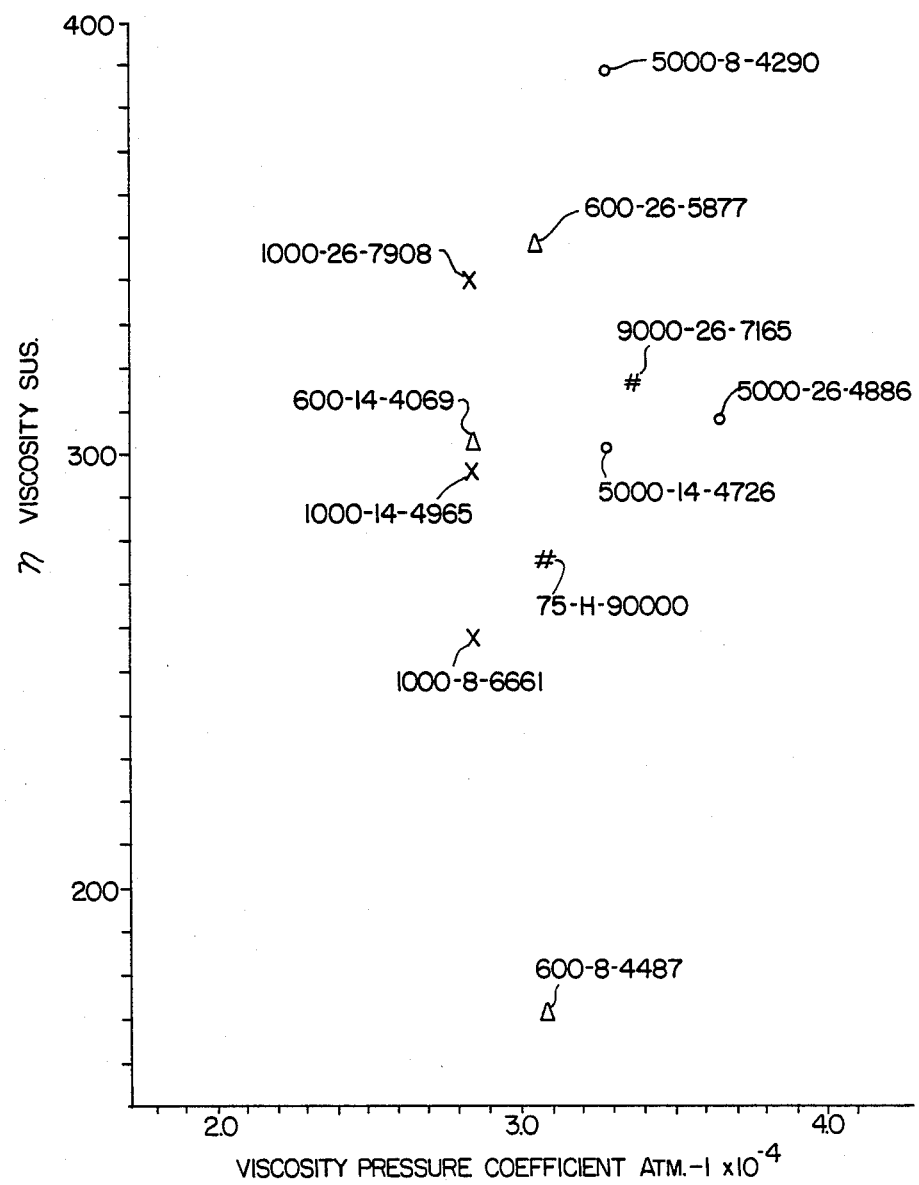
FIG. 11 is a plot of the viscosity and viscosity/pressure coefficients of the connected branch copolymers in solutions containing 20 percent weight of the polymer and 80 percent weight of an 44 weight percent ethylene glycol/56 weight percent water solvent.

Since the most important properties affecting the suitability of the connected branch copolymers for use in lubricant compositions are the viscosity of the ready-to-use lubricant composition and the viscosity/pressure coefficient thereof, comparison of the suitability of various connected branch copolymers for use in lubricant compositions with a specific concentration of polymer and specific solvents is most easily made by means of a two-dimensional plot using these two properties as the axes. FIG. 11 is such a plot prepared for the connected branch copolymers in compositions comprising 20 percent by weight of the polymer and 80 percent by weight of the 44 percent by weight ethylene glycol/56 percent by weight water mixture, prepared using data from Tables VIII and IX above. In FIG. 11, connected branch copolymers having 600 molecular weight core segments are represented by triangles, those having 1000 molecular weight core segments by crosses and those having 5000 molecular weight core segments by circles. The prior art UCON FLUID 75-H-90000 linear polymer is represented by the symbol #, while the single connected branch copolymer having a 9000 molecular weight core segment is represented by =. As can easily be seen from FIG. 11, the 5000-8-4295 and 5000-26-4886 connected branch copolymers have the greatest increase in the desirable combination of properties as compared with the prior art 75-H-90000 linear polymer. These two connected branch copolymers have a core segment molecular weight within the optimum range discussed above, but have the extreme values of the numbers of branches. However, these two connected branch copolymers furnish bases for further improvement in the methods and lubricant compositions of the invention. As previously noted, there are good theoretical reasons to believe that the type of connected branch copolymer having a plurality of groups of branched polymer segments and linear polymer segments would have advantages over the simple type of connected branch copolymer having only a single group of branched polymer segments and a single group of linear polymer segments, and a complex form of connected branch copolymer which, in effect, uses the 5000-26-4886 connected branch copolymer as its complex core might yield further improvements in the methods and lubricant compositions of this invention.

It will be apparent to those skilled in the art that numerous changes and modifications can be made in the preferred embodiments of the invention described above. Accordingly, the whole of the foregoing description is to be construed in an illustrative and not in a limitative sense, the scope of the invention being defined solely by the appended claims.

We claim:
1. In a method of reducing friction between two articles moving relative to, and closely adjacent, one another by disposing between adjacent surfaces of the two articles a lubricant composition comprising water and a polymer dissolved therein, the improvement which comprises using as the polymer a connected branch copolymer comprising:
  (A) a core segment having a valence of v, wherein v is an integer, and having correspondingly v terminal bonds each connected to one of a group of:
  (B) v polyvalent, non-crosslinked branched polymer segments each having an average of t terminal bonds, wherein t is greater than about two, one of said terminal bonds being connected to said core segment, and each of said branched polymer segments being connected via its remaining (t−1) terminal bonds to:
  (C) a set of linear polymer segments, with an average of (t−1) linear polymer segments per set, to provide a group of about v(t−1) linear polymer segments wherein the linear polymer segments have substantially similar chain lengths and composition within the group, the connected branch copolymer having a group of terminal linear polymer segments bearing terminal groups capable of hydrogen bonding.

2. A method according to claim 1 wherein the lubricant composition comprises from about 5 to about 40 percent by weight of the connected branch copolymer and from about 95 to about 60 percent by weight of water.

3. A method according to claim 1 wherein the lubricant composition further comprises an alkylene glycol.

4. A method according to claim 3 wherein the lubricant composition comprises at least about 40 percent by weight of water, from about 5 to about 55 percent by weight of the alkylene glycol and from about 2 to about 40 percent by weight of the connected branch copolymer, the polymer being dissolved in the water/alkylene glycol mixture.

5. A method according to claim 4 wherein the lubricant composition comprises about 45 to about 70 percent by weight of water, from about 25 to about 50 percent by weight of the alkylene glycol and from about 5 to about 25 percent by weight of the connected branch copolymer.

6. A method according to claim 3 wherein the alkylene glycol is ethylene or diethylene glycol.

7. A method according to claim 1 wherein the lubricant composition has a viscosity of at least about 30cSt. at 40° C.

8. A method according to claim 1 wherein the lubricant composition has a viscosity pressure coefficient of at least about $2.8 \times 10^{-4} \text{atm}^{-1}$ at 25° C.

9. A method according to claim 1 wherein, in the connected branch copolymer, the linear polymer segments are divalent containing bonds connected to a second set of about $v(t-1)$ branched polymer segments each having an average of $t'$ terminal bonds, each of the branched polymer segments in the second set in turn being connected to a second set of linear polymer segments, with an average of $t'-1$ linear polymer segments per set, wherein $t'$ is greater than about two, providing a second group of about $(t'-1)[v(t-1)]$ linear polymer segments, and wherein the linear polymer segments have substantially similar chain lengths and compositions within the second group.

10. A method according to claim 9 wherein the connected branch copolymer has only two groups of linear polymer segments so that the second group of linear polymer segments bear terminal groups capable of effecting hydrogen bonding.

11. A method according to claim 9 wherein, in the connected branch copolymer, there are at least three groups of alternating branched polymer segments and linear polymer segments extending away from the core segment, the last, terminal group of linear polymer segments extending furthest from the core bearing terminal groups capable of effecting hydrogen bonding.

12. A method according to claim 1 wherein, in the connected branch copolymer, the core, branched and linear segments provide separate hydrophobic and hydrophilic portions of the polymer.

13. A method according to claim 1 wherein the connected branch copolymer is an organic polymer comprising only the elements carbon, hydrogen, oxygen, nitrogen, phosphorus and silicon.

14. A method according to claim 13 wherein the connected branch copolymer comprises only the elements carbon, hydrogen, oxygen and nitrogen.

15. A method according to claim 1 wherein, in the connected branch copolymer, the core segment has a linear or star structure.

16. A method according to claim 15 wherein the connected branch copolymer has a divalent linear core segment connecting two polyvalent, non-crosslinked, branched polymer segments, which are in turn connected to two sets of linear polymer segments.

17. A method according to claim 15 wherein, in the connected branch copolymer, the linear core segment comprises a polysiloxane, polyoxyalkylene, polyphosphazine, polyalkylene, polyester, polyamide, polyurethane or an alkyl ether.

18. A method according to claim 17 wherein, in the connected branch copolymer, the linear core segment comprises an oxyalkylene homopolymer, or a random or block copolymer of an oxyalkylene.

19. A method according to claim 18 wherein, in the connected branch copolymer, the linear core segment further comprises a glycidyl polyether derived from methyl glycidyl ether.

20. A method according to claim 18 wherein, in the connected branch copolymer, the linear core segment is an ethylene oxide/propylene oxide copolymer.

21. A method according to claim 18 wherein, in the connected branch copolymer, the core segment has a number average molecular weight in the range of about 2000 to about 10000.

22. A method according to claim 15 wherein, in the connected branch copolymer, the star core segment comprises a polyether derived from reacting an alkylene oxide with glycerol, pentaerythritol, dipentaerythritol or trimethylolpropane.

23. A method according to claim 1 wherein the core segment of the connected branch copolymer comprises at least one unit identical with a monomeric unit of the branched segments providing a complex branched, core segment.

24. A method according to claim 23 wherein, in the connected branch copolymer, the complex branched, core segment comprises a glycidyl polyether polymerized onto an ethylene oxide/propylene oxide core reactant.

25. A method according to claim 24 wherein, in the connected branch copolymer, the glycidyl polyether is derived from glycidol.

26. A method according to claim 1 wherein, in the connected branch copolymer, at least one branched polymer segment comprises a polyether or polyamine.

27. A method according to claim 1 wherein, in the connected branch copolymer, at least one branched polymer segment comprises residues of a monomer of the formula:

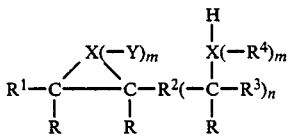

wherein X is nitrogen, oxygen, or sulfur; Y is alkyl, alkylamine or hydroxyalkyl; R is hydrogen or lower alkyl; $R^1$ and $R^3$ are each hydrogen, alkyl, aryl or aralkyl; $R^2$ is (1) an alkyl, aryl or aralkyl group which may be connected to $R^1$ to form a cyclic ring or (2) hydrogen when n is 0; $R^4$ is hydrogen or lower alkyl; m is (1) 0 when X is oxygen or sulfur or (2) 1 when X is nitrogen; n is 0 or 1 provided that n is 1 when X is oxygen or sulfur.

28. A method according to claim 27 wherein, in the connected branch copolymer, at least one branched polymer segment comprises a glycidyl polyether.

29. A method according to claim 28 wherein, in the connected branch copolymer branched polymer segment, the glycidyl polyether is derived from glycidol.

30. A method according to claim 1 wherein, in the connected branch copolymer, at least one branched polymer segment comprises a polyimine derived from aziridine.

31. A method according to claim 1 wherein, in the connected branch copolymer, at least one of the branched polymer segments has a reduced branching density due to the presence of linear polymer segments within the branched polymer segment.

32. A method according to claim 1 wherein, in the connected branch copolymer, the terminal groups capable of effecting hydrogen bonding comprise carboxylic acid groups, esters, salts or amides of carboxylic acid groups, amino groups, phosphate groups, esters, salts or amides of phosphate groups, or hydroxyl groups.

33. A method according to claim 32 wherein the terminal groups capable of effecting hydrogen bonding are hydroxyl groups.

34. A method according to claim 33 wherein the terminal linear polymer segments comprise hydroxyl-terminated polyoxyalkylene linear polymer segments.

35. A method according to claim 34 wherein, in the connected branch copolymer, the polyoxyalkylene linear polymer segments comprise copolymers of ethylene and propylene oxides.

36. A method according to claim 34 wherein, in the connected branch copolymer, at least one polyoxyalkylene linear polymer segment further comprises a glycidyl polyether derived from methyl glycidyl ether.

37. A method according to claim 1 wherein the average number of terminal linear polymer segments in each molecule of the connected branch copolymer is from about 8 to about 30.

38. A method according to claim 1 wherein the number average molecular weight of the terminal linear polymer segments is at least about 4000.

39. A method according to claim 1 wherein the connected branch copolymer is of the formula:

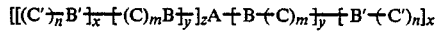

wherein A is a core segment having a valence of $z+1$; B and B' are non-crosslinked, branched polymer segments having valences of $m+1$ and $n+1$, respectively; C and C' are linear polymer segments having substantially similar chain lengths and composition within each group of x or y segments; m is greater than 1 and may vary between each set of linear polymer segments; n is (1) greater than 1 or (2) may be 0 when y is greater than 0; x is (1) 1 when y is 0 or (2) m when y is 1 and the product of all m values when y is greater than 1; y and z are each integers greater than or equal to 0; provided that y is at least 1 when z is 0.

40. A method according to claim 39 wherein the structure of the connected branch copolymer is such that in said formula y is 0 and z is 1, the connected branch copolymer thus being of the formula:

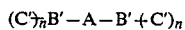

wherein A, B', C' and n are as defined in claim 39.

41. A method according to claim 1 wherein the lubricant composition further comprises at least one of an anti-oxidant, an anti-wear, an anti-corrosion and an extreme pressure additive.

42. In a method of reducing friction between two articles moving relative to, and closely adjacent to one another, by disposing between adjacent surfaces of the two articles a lubricant composition comprising water, an alkylene glycol and a polymer dissolved in the water/alkylene glycol mixture, the improvement which comprises using as the lubricant composition a composition comprising:

from about 45 to about 70 percent by weight of water;

from about 25 to about 50 percent by weight of an alkylene glycol; and from about 5 to about 25 percent by weight of a connected branch copolymer comprising:

(A) a core segment comprising a linear polyether connected to:

(B) two polyvalent, non-crosslinked branched polymer segments each having an average of t terminal bonds, wherein t is greater than about 2, one of the branched polymer segments being connected, via one of its t terminal bonds, to each end of the linear core segment, and each of the branched polymer segments being connected to:

(C) a set of linear, hydroxyl-terminated polyoxyalkylene polymer segments, with an average of $(t-1)$ linear polymer segments per set, to provide a group of about $2(t-1)$ linear polymer segments wherein the linear polymer segments have substantially similar chain lengths and composition within the group, the lubricant composition having a viscosity of at least about 30cSt at 40° C. and a viscosity pressure coefficient of at least about $2.8 \times 10^{-4}$atm$^{-1}$ at 25° C.

43. A lubricant composition comprising:

at least about 40 percent by weight of water;

from about 5 to about 55 percent by weight of an alkylene glycol; and from about 2 to about 40 percent by weight of a connected branch copolymer comprising:

(A) a core segment having a valence of v, wherein v is an integer, and having correspondingly v terminal bonds each connected to one of a group of:

(B) v polyvalent, non-crosslinked branched polymer segments each having an average of t terminal bonds, wherein t is greater than about two, one of said terminal bonds being connected to said core segment and each of said branched polymer segments being connected via its remaining $(t-1)$ terminal bonds to:

(C) a set of linear polymer segments, with an average of $(t-1)$ linear polymer segments per set, to provide a group of about $v(t-1)$ linear polymer segments wherein the linear polymer segments have substantially similar chain lengths and composition within the group, the connected branch copolymer having a group of terminal linear polymer segments bearing terminal groups capable of effecting hydrogen bonding.

44. A lubricant composition according to claim 43 comprising from about 45 to about 70 percent by weight of water, from about 25 to about 50 percent by weight of the alkylene glycol and from about 5 to about 25 percent by weight of the connected branch copolymer; the connected branch copolymer being dissolved in the water/alkylene glycol mixture.

45. A lubricant composition according to claim 43 wherein the alkylene glycol is ethylene or diethylene glycol.

46. A lubricant composition according to claim 43 having a viscosity of at least about 30cSt at 40° C.

47. A lubricant composition according to claim 43 having a viscosity pressure coefficient of at least about $2.8 \times 10^{-4}$atm$^{-1}$ at 25° C.

48. A lubricant composition according to claim 43 wherein, in the connected branch copolymer, the core, branched and linear segments provide separate hydrophobic and hydrophilic portions of the polymer.

49. A lubricant composition according to claim 43 wherein the connected branch copolymer is an organic polymer comprising only the elements carbon, hydrogen, oxygen, nitrogen, phosphorus and silicon.

50. A lubricant composition according to claim 49 wherein the connected branch copolymer comprises only the elements carbon, hydrogen, oxygen and nitrogen.

51. A lubricant composition according to claim 43 wherein, in the connected branch copolymer, the core segment has a linear or star structure.

52. A lubricant composition according to claim 51 wherein the connected branch copolymer has a divalent linear core segment connecting two polyvalent, non-crosslinked, branched polymer segments, which are in turn connected to two sets of linear polymer segments.

53. A lubricant composition according to claim 51 wherein, in the connected branch copolymer, the linear core segment comprises an oxyalkylene homopolymer, or a random or block copolymer of an oxyalkylene.

54. A lubricant composition according to claim 53 wherein, in the connected branch copolymer, the linear core segment is an ethylene oxide/propylene oxide copolymer.

55. A lubricant composition according to claim 53 wherein, in the connected branch copolymer, the core segment has a number average molecular weight in the range of about 4000 to about 16000.

56. A lubricant composition according to claim 43 wherein, in the connected branch copolymer, the terminal groups capable of effecting hydrogen bonding comprise carboxylic acid groups, esters, salts or amides of carboxylic acid groups, amino groups, phosphate groups, esters, salts or amides of phosphate groups, or hydroxyl groups.

57. A lubricant composition according to claim 56 wherein the terminal groups capable of effecting hydrogen bonding are hydroxyl groups.

58. A lubricant composition according to claim 57 wherein the terminal linear polymer segments comprise hydroxyl-terminated polyoxyalkylene linear polymer segments.

59. A lubricant composition according to claim 58 wherein, in the connected branch copolymer, the terminal polyoxyalkylene linear polymer segments comprise copolymers of ethylene and propylene oxides.

60. A lubricant composition according to claim 43 wherein the average number of terminal linear polymer segments in each molecule of the connected branch copolymer is from about 8 to about 30.

61. A lubricant composition according to claim 43 wherein the average molecular weight of the terminal linear polymer segments is at least about 4000.

62. A lubricant composition comprising from 80 to 98 percent by weight of water and from 20 to 2 percent by weight of a connected branch copolymer dissolved in the water, the copolymer comprising:

(A) a core segment having a valence of v, wherein v is an integer, and having correspondingly v terminal bonds each connected to one of a group of:
(B) v polyvalent, non-crosslinked branched polymer segments each having an average of t terminal bonds, wherein t is greater than about two, one of said terminal bonds being connected to said core segment, and each of said branched polymer segments being connected via its remaining $(t-1)$ terminal bonds to:
(C) a set of linear polymer segments, with an average of $(t-1)$ linear polymer segments per set, to provide a group of about $v(t-1)$ linear polymer segments wherein the linear polymer segments have substantially similar chain lengths and composition within the group, the connected branch copolymer having a group of terminal linear polymer segments bearing terminal groups capable of effecting hydrogen bonding.

63. A lubricant composition according to claim 62 comprising at least about 5 percent by weight of the connected branch copolymer.

64. A lubricant composition according to claim 62 having a viscosity of at least about 30cSt at 40° C.

65. A lubricant composition according to claim 62 having a viscosity pressure coefficient of at least about $2.8 \times 10^{-4} \text{atm}^{-1}$ at 25° C.

66. A lubricant composition according to claim 62 wherein, in the connected branch copolymer, the core segment comprises an oxyalkylene homopolymer or a random or block copolymer of an oxyalkylene.

67. A lubricant composition according to claim 62 wherein the connected branch copolymer is an organic polymer comprising only the elements carbon, hydrogen, oxygen, nitrogen, phosphorus and silicon.

68. A lubricant composition according to claim 67 wherein the connected branch copolymer comprises only the elements carbon, hydrogen, oxygen and nitrogen.

69. A lubricant composition according to claim 62 wherein, in the connected branch copolymer, the terminal groups capable of effecting hydrogen bonding comprise carboxylic acid groups, esters, salts or amides of carboxylic acid groups, amino groups, phosphate groups, esters, salts or amides of phosphate groups, or hydroxyl groups.

70. A lubricant composition according to claim 69 wherein the terminal groups capable of effecting hydrogen bonding are hydroxyl groups.

71. A lubricant composition according to claim 70 wherein the terminal linear polymer segments comprise hydroxyl-terminated polyoxyalkylene linear polymer segments.

72. A lubricant composition according to claim 62, wherein the average number of terminal linear polymer segments in each molecule of the connected branch copolymer is from about 8 to about 30.

73. A lubricant composition according to claim 62 wherein the average molecular weight of the terminal linear polymer segments is at least about 4000.

* * * * *